United States Patent
Kang et al.

(10) Patent No.: US 8,635,266 B2
(45) Date of Patent: Jan. 21, 2014

(54) METHOD AND SYSTEM FOR DATA SYNCHRONIZATION, AND APPARATUS THEREOF

(75) Inventors: Jiao Kang, Shenzhen (CN); Xiangzhou Guo, Shenzhen (CN); Linyi Tian, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 422 days.

(21) Appl. No.: 12/180,626

(22) Filed: Jul. 28, 2008

(65) Prior Publication Data

US 2009/0157802 A1 Jun. 18, 2009

Related U.S. Application Data

(63) Continuation of application No. PCT/CN2007/000284, filed on Jan. 25, 2007.

(30) Foreign Application Priority Data

Jan. 26, 2006 (CN) .......................... 2006 1 0003042
May 31, 2006 (CN) .......................... 2006 1 0085153

(51) Int. Cl.
  *G06F 15/16* (2006.01)
  *G06F 7/00* (2006.01)

(52) U.S. Cl.
  USPC ........... 709/203; 709/201; 709/217; 709/219; 709/248; 707/610; 707/611

(58) Field of Classification Search
  USPC .......... 709/201, 203, 217, 219, 248; 707/610, 707/611
  See application file for complete search history.

(56) References Cited

U.S. PATENT DOCUMENTS 6,535,892 B1 * 3/2003 LaRue et al. .......................... 1/1
6,880,107 B1 * 4/2005 Kraft, IV ........................ 714/36

(Continued)

FOREIGN PATENT DOCUMENTS

CN    1407475    4/2003
CN    1472911    2/2004

(Continued)

OTHER PUBLICATIONS

SyncML Sync Protocol, Version 1.1 2002, SyncML Sync Protocol, Feb. 15, 2002, pp. 162. XP003013007.

(Continued)

*Primary Examiner* — Ranodhi Serrao
*Assistant Examiner* — Farrukh Hussain
(74) *Attorney, Agent, or Firm* — Huawei Technologies Co., Ltd.

(57) ABSTRACT

Embodiments of the present disclosure disclose a data synchronization method, system and apparatuses thereof. The data synchronization method includes the following processes: sending, by a client, a data characteristic verification message carrying one or multiple data characteristics for data in a client database, to a server; comparing, by the server, the one or multiple data characteristics carried in the data characteristic verification message with the data characteristics for the data in a server database; determining, by the server, the data to be synchronized based on a result of the comparing and sending the client a data characteristic verification response carrying information indicating the determined data to be synchronized; and determining, by the client, the data to be synchronized according to the information in the data characteristic verification response, and synchronizing the determined data to be synchronized with the server. The method, system and apparatus thereof provided by the embodiments of the present disclosure can reduce the amount of data to be transmitted in data synchronization, and improve the efficiency of data synchronization.

24 Claims, 24 Drawing Sheets

(56) References Cited

U.S. PATENT DOCUMENTS

| | | | |
|---|---|---|---|
| 7,149,813 B2 * | 12/2006 | Flanagin et al. | 709/248 |
| 7,302,591 B2 * | 11/2007 | Oliver et al. | 713/193 |
| 7,376,697 B2 * | 5/2008 | Koskimies | 709/203 |
| 7,526,575 B2 * | 4/2009 | Rabbers et al. | 709/248 |
| 2003/0045311 A1 | 3/2003 | Larikka | |
| 2003/0115301 A1 | 6/2003 | Koskimies | |
| 2005/0286801 A1 * | 12/2005 | Nikiforov | 382/286 |
| 2006/0074769 A1 * | 4/2006 | Looney et al. | 705/26 |
| 2007/0112880 A1 * | 5/2007 | Yang et al. | 707/201 |

FOREIGN PATENT DOCUMENTS

| | | |
|---|---|---|
| CN | 1691571 A | 11/2005 |
| CN | 101009516 B | 5/2011 |
| EP | 1291770 | 3/2003 |
| EP | 1564658 A1 | 8/2005 |
| JP | 2000163344 | 6/2000 |
| WO | WO-2005029356 A2 | 3/2005 |

OTHER PUBLICATIONS

"SynchML Data Sync Protocol" Candidate Version 1.2-01 Jun. 2004, Open Mobile Alliance.

Written Opinion of the International Searching Authority (translation) dated (mailed) Mday 17, 2007, issued in related Application No. PCT/CN2007/000284, filed Jan. 25, 2007, Huawei Technologies Co., Ltd.

European Patent Office Communication pursuant to Article 94(3) EPC, as related in Application No. 07702202.8-2413, Ref. No. MXL00211EP, mailing date of Apr. 14, 2011, Huawei Technologies Co., Ltd. (5 pgs.).

* cited by examiner

Server

| GUID | Data |
|---|---|
| 1010101 | Cars |
| 2121212 | Bicycles |
| 3232323 | Trucks |
| 4343434 | Shoes |

Mapping table

| GUID | LUID |
|---|---|
| 1010101 | 11 |
| 2121212 | 22 |
| 3232323 | 33 |
| 4343434 | 44 |

Fig. 2

Client database

| LUID | Name | Status | Fingerprint |
|---|---|---|---|
| 1 | A | | Fa |
| 2 | Bc | u | Fb' |
| 3 | C | | Fc |
| 4 | Dc | u | Fd' |
| 5 | E | d | Fe |
| 6 | F | | Ff |
| 7 | H | a | Fh |

Server database

| LUID | GUID | Name | Status | Fingerprint |
|---|---|---|---|---|
| 1 | 10001 | A | | Fa |
| 2 | 10002 | B | | Fb |
| 3 | 10003 | Cs | u | - |
| 4 | 10004 | Ds | u | - |
| 5 | 10005 | E | | Fe |
| 6 | 10006 | F | | Ff |
| - | 10008 | I | a | - |

Fig. 8b

Client database

| LUID | Name | Status | Fingerprint |
|---|---|---|---|
| 1 | A | | Fa |
| 2 | Bc | | Fb' |
| 3 | C | | Fc |
| 4 | Dc | | Fd' |
| 5 | E | | Fe |
| 6 | F | | Ff |
| 7 | H | | Fh |

Server database

| LUID | GUID | Name | Status | Fingerprint |
|---|---|---|---|---|
| 1 | 10001 | A | | Fa |
| 2 | 10002 | B | | Fb |
| 3 | 10003 | Cs | u | - |
| 4 | 10004 | Ds | u | - |
| 5 | 10005 | E | | Fe |
| 6 | 10006 | F | | Ff |
| - | 10008 | I | a | - |

Fig. 8c

Client database

| LUID | Name | Status | Fingerprint |
|---|---|---|---|
| 1 | A |  | Fa |
| 2 | Bc |  | Fb' |
| 3 | C |  | Fc |
| 4 | Dc |  | Fd' |
| 7 | H |  | Fh |
| 8 | I |  | Fi |

Server database

| LUID | GUID | Name | Status | Fingerprint |
|---|---|---|---|---|
| 1 | 10001 | A |  | Fa |
| 2 | 10002 | Bc |  | Fb' |
| 3 | 10003 | C |  | Fc |
| 4 | 10004 | Dc |  | Fd' |
| 7 | 10007 | H |  | Fh |
| 8 | 10008 | I |  | Fi |

Fig. 8d

Client database

| LUID | Name | Status | Fingerprint |
|---|---|---|---|
| 11 | A |  | Fa |
| 12 | Bc | u | Fb' |
| 13 | C |  | Fc |
| 14 | Dc | u | Fd' |
| 15 | E | d | Fe |
| 16 | F |  | Ff |
| 17 | H | a | Fh |

Server database

| LUID | GUID | Name | Status | Fingerprint |
|---|---|---|---|---|
| 1 | 10001 | A |  | Fa |
| 2 | 10002 | B |  | Fb |
| 3 | 10003 | Cs | u | - |
| 4 | 10004 | Ds | u | - |
| 5 | 10005 | E |  | Fe |
| 6 | 10006 | F |  | Ff |
| - | 10008 | I | a | - |

Fig. 9a

Client database / Server database

| LUID | Name | Status | Fingerprint |
|---|---|---|---|
| 1 | A |  | Fa |
| 2 | B |  | Fb |
| 3 | C |  | Fc |
| 4 | D |  | Fd |
| 5 | E |  | Fe |
| 6 | F |  | Ff |

| LUID | GUID | Name | Status | Fingerprint | Mark |
|---|---|---|---|---|---|
| 1 | 10001 | A |  | Fa | - |
| 2 | 10002 | B |  | Fb | - |
| 3 | 10003 | C |  | Fc | - |
| 4 | 10004 | D |  | Fd | - |
| 5 | 10005 | E |  | Fe | - |
| 6 | 10006 | F |  | Ff | - |

Fig. 10a

Client database / Server database

| LUID | Name | Status | Fingerprint |
|---|---|---|---|
| 1 | A |  | Fa |
| 2 | Bc | u | Fb' |
| 3 | C |  | Fc |
| 4 | D | u | Fd' |
| 5 | E |  | Fe |
| 6 | F |  | Ff |
| 7 | H | a | Fh |

| LUID | GUID | Name | Status | Fingerprint | Mark |
|---|---|---|---|---|---|
| 1 | 10001 | A |  | Fa | - |
| 2 | 10002 | B |  | Fb | - |
| 3 | 10003 | Cs |  | Fc | Null |
| 4 | 10004 | Ds |  | Fd | Null |
| 5 | 10005 | E |  | Fe | - |
| 6 | 10006 | F |  | Ff | - |
| - | 10008 | I |  | a | - |

Fig. 10b

Client database

| LUID | Name | Status | Fingerprint |
|---|---|---|---|
| 1 | A | | Fa |
| 2 | Bc | | Fb' |
| 3 | C | | Fc |
| 4 | D | | Fd' |
| ~~5~~ | ~~E~~ | | ~~Fe~~ |
| 6 | F | | Ff |
| 7 | H | | Fh |

Server database

| LUID | GUID | Name | Status | Fingerprint | Mark |
|---|---|---|---|---|---|
| 1 | 10001 | A | | Fa | - |
| 2 | 10002 | B | | Fb | - |
| 3 | 10003 | Cs | | Fc | Null |
| 4 | 10004 | Ds | | Fd | Null |
| 5 | 10005 | E | | Fe | - |
| ~~6~~ | ~~10006~~ | ~~F~~ | | ~~Ff~~ | ~~-~~ |
| - | 10008 | I | a | - | - |

Fig. 10c

Client database

| LUID | Name | Status | Fingerprint |
|---|---|---|---|
| 11 | A | | Fa |
| 12 | Bc | u | Fb' |
| 13 | C | | Fc |
| 14 | D | u | Fd' |
| ~~15~~ | ~~E~~ | | ~~Fe~~ |
| 16 | F | | Ff |
| 17 | H | a | Fh |

Server database

| LUID | GUID | Name | Status | Fingerprint | Mark |
|---|---|---|---|---|---|
| 1 | 10001 | A | | Fa | - |
| 2 | 10002 | B | | Fb | - |
| 3 | 10003 | Cs | | Fc | Null |
| 4 | 10004 | Ds | | Fd | Null |
| 5 | 10005 | E | | Fe | - |
| ~~6~~ | ~~10006~~ | ~~F~~ | | ~~Ff~~ | ~~-~~ |
| - | 10008 | I | a | - | - |

Fig. 11a

METHOD AND SYSTEM FOR DATA SYNCHRONIZATION, AND APPARATUS THEREOF

This application is a continuation of PCT/CN2007/000284, filed Jan. 25, 2007, which in turn claims priority from Chinese patent application No. 200610003042.6 filed with the Chinese Patent Office on Jan. 26, 2006, and from Chinese patent application No. 200610085153.6 filed with the Chinese Patent Office on May 31, 2006, all of which are incorporated herein by reference in their entirety.

FIELD OF THE INVENTION

The present invention relates to data processing technologies in networks, and particularly, to method and system for data synchronization, and apparatus thereof.

BACKGROUND OF THE INVENTION

In February, 2000, SyncML initiative was created to synchronize personal information or corporation data between multiple platforms and networks. The objective of creating the SyncML initiative was to make a user, a device manufacturer, a basic component developer, a data provider, an application developer and a service provider cooperate with each other, and enable network data to be accessed by any client anywhere at any moment.

A typical application of the SyncML initiative is the data synchronization between a mobile device and a network service device. Besides the above-mentioned application, the SyncML initiative is applicable to the data synchronization between two equivalent devices, such as two computers. The data synchronization of a client and a server includes the following processes. After a negotiation of device information at an initialization phase of the synchronization, the client sends the data changed by the client to the server for storing, and the server sends the data changed by the server to the client for storing, so as to guarantee the data synchronization between the client and the server.

At present, there are mainly several sync types shown in Table 1.

TABLE 1

| Type of synchronization | Description information |
|---|---|
| Two-way sync | A normal sync type in which the client and the server exchange information about modified data in these devices, and information about data not being modified is not exchanged in these devices. The client sends the modifications first. |
| Slow sync | A special form of two-way sync in which all items are compared with each other on a field-by-field basis. In practice, this means that the client sends all its data from a datastore to the server andt he server does the sync analysis (field-by-field) for the data received from the client and the data stored in the server itself. |
| One-way sync from client only | A sync type in which the client sends modifications of the client to the server but the server does not send modifications of the server back to the client. |
| Refresh sync from client only | This type of sync is a one-side sync in which the client sends all its data from a datastore to the server; and the server replaces all data corresponding to the client in the server with the data sent by the client. |
| One-way sync from server only | A sync type in which the client gets all modifications from the server but the client does not send its modifications to the server. |
| Refresh sync from server only | This type of sync is similar to the type of Refresh sync from client only, and in this type of sync the server sends a client all data corresponding to the client and stored in the server, the client replaces all data in the client with the data sent by the server, that is the data in the client is same as the data corresponding to the client and stored in the server. |
| Server Alerted sync | A sync alert type, which provides the means for a server to alert the client to perform synchronization. When the server alerts the client, it also tells the client which type of synchronization to initiate, and type of the following synchronization may be one of the above mentioned types of synchronization. |

How to perform data synchronization is hereinafter described by taking the two-way sync as example. Other sync types are special cases of the two-way sync. For example, the slow sync is the two-way sync in which both client and server can send out all the data of the user; one-way sync is the two-way sync in which the data of the user is sent in one way; refresh sync is the slow sync in which the data of the user is sent in one way.

Two-way data sync between a server and a client includes the following steps.

In step 1, a client sends a synchronization initialization package to a server.

In step 2, the server sends the synchronization initialization package to the client.

In step 1 and step 2, a synchronization initialization is performed. The synchronization initialization includes the following processes: authentication, synchronization data negotiation, device information negotiation, etc. The device information negotiation determines what data format can be synchronized, and which synchronization types are supported.

In step 3, the client sends synchronization data to the server.

In step 4, the server sends synchronization data to the client.

In step 3 and step 4, the client sends changed data to the server based on change state of the data. And the change state of the data may be Add, Update, Delete, Move, etc. The server modifies the data stored in the server according to the data received from the client, so that the server fulfils the data synchronization. And the server also sends the changed data to the client based on the change state of data stored in the server, and the client modifies the data stored in the client according to the data received from the server, so that the client fulfils the data synchronization.

In step 5, after receiving the synchronization data, the client sends a synchronization acknowledgement message to the server.

In step 6, after receiving the synchronization data, the server sends synchronization acknowledgement message to the client.

The message package may be used in the above-mentioned steps. And an interaction with the same function between the client and the server should be performed several times by exchanging several messages within one message package, before the interaction is completed. Two message packages, i.e. one sending package and one receiving package, may be used to express the interaction.

The system for data synchronization includes the client and the server which interact with each other to exchange information. On client side, there may be also a database for storing the data needed by a user. The client database can be set in the client or can be set separately. On server side, there may be also another database for storing the data of the server. The server database can be set in the server or can be set separately.

In general, the client can be an intelligent terminal, such as a computer, a mobile terminal or a Personal Digital Assistant (PDA). The data stored in the database at the client side may include: contacts, calendars, notes, Emails, etc. There may be standard data formats for all of the above data. The client can convert the stored data into standard data format, and send the converted data to the server. After the received data is processed by the server, the server may store the processed data into the database at the server side.

In general, the server can be a computer or a network server performing data synchronization. And the server can receive a data synchronization message or a data synchronization command from the client; or the server can send a data synchronization message or a data synchronization command to the client.

FIG. 1 shows a data table of the data stored in the client database. Each data item is identified by a Local Unique Identifier (LUID). Each LUID can be unique for a type of data, or for a client. And each data item has a Change Log recording data status, i.e., the Status shown in FIG. 1.

FIG. 2 shows a data table of the data stored in the server database. Each data item may be identified by a Global Unique Identifier (GUID) of the data synchronization network. And a mapping table is set up to record mapping relations between GUID and LUID for the same data item.

The interaction between the client and the server can result in a change of data item status of the data in the client database or the server database. The client and the server can determine what kind of data synchronization instruction or/and data synchronization message may be received according to the changes of data item status of the data in the client database and server database respectively.

The data synchronization instruction or/and data synchronization message sent from the client to the server include: <Add>, which indicates that the client sends new data item and LUID thereof to the server, then the server adds the data item sent from the client into the server database, and creates a GUID for the data item sent from the client and stores a mapping relation between the LUID and GUID of the data item sent from the client; <Update>, which indicates that the client sends updated data item and LUID thereof to the server, then the server finds out a corresponding GUID of the LUID according to a mapping relation stored, updates the data corresponding to the GUID and stores the updated data; <Delete>, which indicates that the client sends LUID for the data item to be deleted to the server, then the server finds out a corresponding GUID of the LUID according to a mapping relation stored, deletes the data item corresponding to the GUID and removes the mapping relation between the LUID and GUID from a mapping table; <Move>, which indicates that the client sends an original LUID and a destination LUID of the data item to be moved to the server, then the server finds out an original GUID corresponding to the original LUID and a destination GUID corresponding to the destination LUID, and moves the data corresponding to the original GUID to the data item corresponding to the destination GUID.

The data synchronization instruction or/and data synchronization message sent from the server to the client include: <Add>, which indicates that the server sends new data item and GUID thereof to the client, then the client adds the data item sent from the server into the client database, and creates a LUID for the data item sent from the client and returns a newly-created LUID to the server; <Update>, which indicates that the server sends updated data item and LUID thereof to the client, then the client updates the data item corresponding to the LUID, and stores the updated data; <Delete>, which indicates that the server sends LUID for the data item to be deleted to the client, and removes a mapping relation of the LUID and the GUID from a mapping table, then the client deletes the data item corresponding to the LUID; and <Move>, which indicates that the server sends an original LUID of the data item and a destination LUID of the data item to be moved to the client, then the client moves data corresponding to the original LUID to the data item corresponding to the destination LUID.

At present, anchors may be used for indicating the latest successful data synchronization session between a client and a server. Anchors may be used in the server database or client database, i.e., when the data synchronization is completed between the client and the server, the same anchor may be created in the client database and the server database. When another data synchronization is initiated later, the client or the server shall first check whether the anchor in the client database is identical with the anchor in the server database. And if the anchor in the client database is identical with the anchor in the server database, normal data synchronization will be performed; otherwise a slow sync or a refresh sync will be initiated.

The process of updating the anchor between the client and the server includes the following steps:

Step 1: A client sends a synchronization data package to a server, and the synchronization data package carries synchronization data, last anchor for the last synchronization session, and next anchor for the present synchronization session.

Step 2: Upon receiving the synchronization data package, the server compares the last anchor sent from client with the last anchor in the server database, if the received last anchor is identical with the last anchor stored in the server database, the server synchronizes data of the server with the synchronization data carried by the synchronization data package, updates the anchor in the server database in accordance with the anchor carried by the synchronization data package for the present synchronization session, and returns a synchronization data package carrying the synchronization data to the client. The synchronization data includes the data identified as modified in the server database; if the last anchor in the package is different from the anchor in the server database, the server initiates a slow sync or a refresh sync.

When there is slow sync between the client and the server, the client has to send all data in the client database to the server, and the server shall compare every data item of the client database with corresponding data item in the server database. At present, the slow sync may be initiated due to the following reasons. The first reason is that the LUIDs in the client database are out of order or lost, the re-use of LUID by the client or the re-creature of LUID would make the LUIDs out of order, thus the LUID-GUID mapping table in the server becomes useless, and the client and the server are unable to determine how data items in databases correspond to each other. The second reason is that the Change Log in the client database is lost, so it becomes impossible to tell which data item has been synchronized and which data item still needs to be synchronized. The third reason is that the anchors of the client and the server are different from each other, even when the client initiates a fast synchronization, the server would still find that the anchors of the client and the server are different from each other, thus the client and the server would not know whether the data of the server and the client are synchronized, then a slow sync has to be initiated.

For the first or second reason described above, the client may be initiate a slow sync on its own initiative; and for the third reason, the client initiates a slow sync on its own initiative, or the server requests the client to initiate the slow sync.

SUMMARY OF THE INVENTION

The present disclosure provides a data synchronization method to decrease data transmission quantity and increase data synchronization efficiency.

The present disclosure also provides a data synchronization system to decrease data transmission quantity and increase data synchronization efficiency.

And the present disclosure also provides data synchronization apparatus to decrease data transmission quantity and increase data synchronization efficiency.

The data synchronization method includes the following processes: sending, by a client, a data characteristic verification message carrying one or multiple data characteristics for data in a client database, to a server; comparing, by the server, the one or multiple data characteristics carried in the data characteristic verification message with the data characteristics for the data in a server database; determining, by the server, the data to be synchronized based on a result of the comparing and sending the client a data characteristic verification response carrying information indicating the determined data to be synchronized; and determining, by the client, the data to be synchronized according to the information in the data characteristic verification response, and synchronizing the determined data to be synchronized with the server.

The data synchronization system includes: a client, configured to be connected to a database for client; and a server, configured to synchronize data with the data on the client, and configured to be connected to the database for server;

and each of the client and the server includes a synchronization module, a data processing module connected to the synchronization module and the database, and a data characteristic information processing module connected to the synchronization module;

the data processing module is configured to send the data in the database to the synchronization module, or receive a data synchronization message from the synchronization module, and modify or add data in the database based on synchronization data in the data synchronization message;

the data characteristic information processing module is configured to set up data characteristics for the data in the synchronization module, and send the data characteristics to the synchronization module; and the synchronization module connected to the server or the client, is configured to compare the data characteristics of the data sent from the server or the client with the data characteristics set up by the data characteristic information processing module for corresponding data, send result of the comparison to the server or the client, receive the data synchronization message carrying the synchronization data from the server or the client, and forward the data synchronization message to the data processing module; or the synchronization module is configured to send the data characteristic set up by the data characteristic information processing module to the server or the client, receive the result of the comparison from the server or the client, and send data synchronization message carrying synchronization data to the server or the client according to the result of the comparison, so that the server or the client synchronizes the data on the server or the client.

A data synchronization client includes: a database for the client, a synchronization module, a data characteristic information processing module connected to the synchronization module, and a data processing module connected to the synchronization module and the database for the client;

and the data processing module is configured to send data in the database to the synchronization module, or receive a data synchronization message from the synchronization module, and modify or add data in the database based on the synchronization data in the data synchronization message;

the data characteristic information processing module is configured to set up data characteristics for the data in the synchronization module, and send the data characteristics to the synchronization module; and the synchronization module is configured to compare the data characteristics of the data sent from a server with the data characteristics set up by the data characteristic information processing module for corresponding data, send a result of the comparison to the server, receive the data synchronization message carrying the synchronization data from the server, and forward the data synchronization message to the data processing module; or the synchronization module is configured to send the data characteristic set up by the data characteristic information processing module to the server, receive the result of the comparison from the server, and send data synchronization message carrying synchronization data to the server according to the result of the comparison so that the server can synchronize the data on the server.

A data synchronization server includes: a database for the server, a synchronization module, a data characteristic information processing module connected to the synchronization module, and a data processing module connected to the synchronization module and the database for the server;

and the data processing module is configured to send data in the database to the synchronization module, or receive a data synchronization message from the synchronization module, and modify or add data in the database based on the synchronization data in the data synchronization message;

the data characteristic information processing module is configured to set up data characteristics for the data in the synchronization module, and send the data characteristics to the synchronization module;

the synchronization module is configured to compare the data characteristics of the data sent from a client with the data characteristics set up by the data characteristic information processing module for corresponding data, send a result of the comparison to the client, receive the data synchronization message carrying the synchronization data from the client, and forward the data synchronization message to the data processing module; or the synchronization module is configured to send the data characteristic set up by the data characteristic information processing module to the client, receive the result of the comparison from the client, and send data synchronization message carrying synchronization data to the client according to the result of the comparison, so that the client synchronizes the data on the client.

According to the above-mentioned method, system and apparatus, data characteristic information for the data stored in the client database and in the server database is set up respectively. To be specific, the data characteristic of the data in the client database is set up by the client by computing, and the data characteristic of the data in the server database is set up by the server by computing or received by the server from the client and stored by the server. When the client and the server synchronize data thereof, the client sends to the server the data characteristic set up for the data in the client database. The server verifies the data characteristic of corresponding data stored in the server database based on the received data characteristic, and sends to the client the information about the data failing to pass verification. The client begins to synchronize the data failing to pass verification according to the information received from the server. The length of the data characteristic information is short comparatively, therefore the data to be transmitted by the client sending the data characteristic information to the server for verification, are much less than the data transmitted by the client having to send all the data in the client database to the server. Even the quantity of the data characteristic information and the data to be synchronized after the verification, i.e., the data failing to the pass the verification, is less than the quantity of all data in the client database. Hence the system, method and apparatus provided by the present disclosure reduce the quantity of data to be transmitted in the data synchronization process, store the network bandwidth and improve the data synchronization efficiency.

BRIEF DESCRIPTION OF THE DRAWINGS

FIG. 2 is a schematic illustrating how data are stored in the server database of the prior art.

FIG. 8b is a schematic illustrating modification status of the data items in the client database and the server database in the embodiment of the present disclosure.

FIG. 8c is a schematic illustrating modification status of the data items in the client database and the server database when Change Logs of the data items in the client database are lost in the embodiment of the present disclosure.

FIG. 8d is a schematic illustrating modification status of the data items in the client database and the server database after the data synchronization in the embodiment of the present disclosure.

FIG. 9a is a schematic illustrating modification status of the data items in the client database and the server database in an embodiment of the present disclosure.

FIG. 10a is a schematic illustrating initial status of the data items in the client database and the server database in an embodiment of the present disclosure.

FIG. 10b is a schematic illustrating modification status of the data items in the client database and the server database in the embodiment of the present disclosure.

FIG. 10c is a schematic illustrating modification status of the data items in the client database and the server database when Change Logs of the data items in the client database are lost in the embodiment of the present disclosure.

FIG. 11a is a schematic illustrating modification status of the data items in the client database and the server database in an embodiment of the present disclosure.

DETAILED DESCRIPTION OF THE INVENTION

Figure 1:
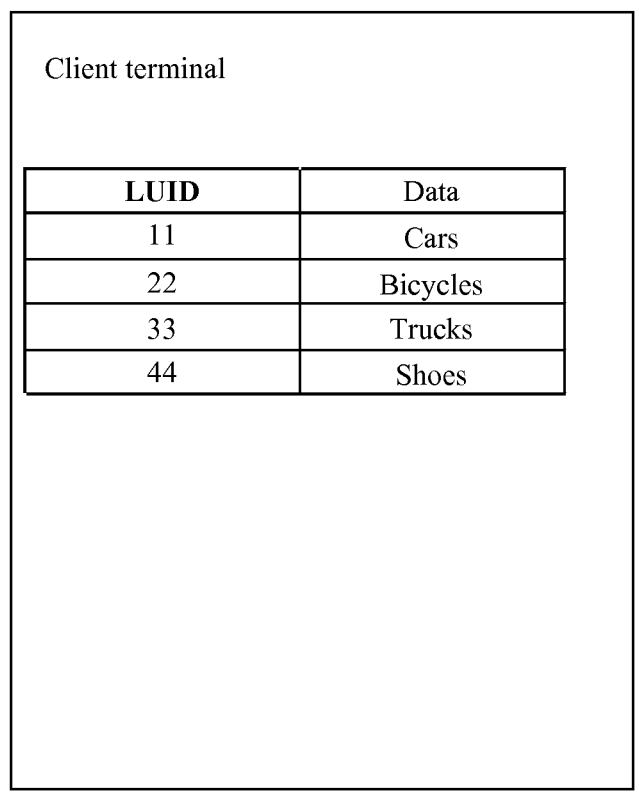
FIG. 1 is a schematic illustrating how data are stored in the client database of the prior art.

At present, the slow sync between the client and the server has the following disadvantages.

The client has to send all the data in the client database to the server, a majority of the data might have been synchronized, therefore a mass of data will be transmitted and the time for data synchronization will be very long.

The server has to compare each received data item, which takes a long period of processing time.

It is unreasonable to adopt the anchor technique in data synchronization. In a network requiring data synchronization, a slow sync is very common. When network is disconnected during data synchronization, client is cancelled by a user, or the client is reset by the user, the anchors in the server and the client will be inconsistent with each other, which results in a slow sync. In practical applications, the anchors in the server and the client are inconsistent with each other, which does not mean that data in the client database and data in the server database are different completely. For example, if the client and the server need to synchronize one hundred data items, and network fails when the 50th data item is synchronized, so the first fifty data items are synchronized already and do not need to be transmitted in the following synchronization process. But the first fifty data items will still be sent out in the following synchronization since the anchors in the client and the server are inconsistent with each other. Therefore, the slow sync or the refresh sync may be thus performed, and the first fifty data items will become obsolete data.

In data synchronization, especially in the slow sync, the client and the server need to send all data in databases to each other. A large quantity of obsolete data, which is already synchronized in previous synchronization and needs not to be synchronized again, will emerge. The obsolete data includes the types of: data unchanged by the client and the server, data synchronized by the client and the server, and the same data modified both by the client and by the server. The large quantity of obsolete data increases flow of network traffics, decreases data synchronization efficiency, and costs user a lot of money.

The embodiments of the present disclosure are further described hereinafter in detail with reference to accompanying drawings, so as to make the technical solution and merits thereof more apparent.

In data synchronization process between a client and a server, the term "obsolete data" indicates the data stored in the client database, and being identical with data stored in the server database at present. The obsolete data includes: data unchanged by the client and the server, data synchronized by the client and the server, and the same data item modified separately by both the client and the server in the database thereof.

In data synchronization process, particularly in slow sync, the client and the server need to exchange data in the client database and the server database without transmitting identical obsolete data to each other. An optimized sync type, i.e., smart sync, is put forward in embodiments of the present disclosure. The smart sync includes the following processes. Data characteristic information is set up for all data in the client database and the server database. The data characteristic information is verified, i.e., comparing the data characteristic information of the data in the client database with the data characteristic information of the data in the server database, distinguishing the data to be synchronized from the obsolete data. Only the data to be synchronized is transmitted in the following synchronization process, which prevents transmission of the obsolete data, reduces the quantity of the data to be transmitted, and improves data synchronization efficiency.

In embodiments of the present disclosure, the data characteristic information includes: data fingerprints which are unique identifications identifying data contents precisely, i.e., different data has different data fingerprints and identical data has identical data fingerprints. The embodiments employ Digest algorithms, e.g., the Message Digest Algorithm 5 (MD5) and Secure Hash Algorithm (SHA), or cyclic redundancy check algorithm, e.g., the Cyclic Redundancy Check (CRC) algorithm, or normal hash algorithm, e.g., HASH algorithm, or timestamp algorithm, e.g., timestamp for setup or timestamp for modification.

Data fingerprints are used as the data characteristic information in the description of the embodiments herein.

In an embodiment of the present disclosure, data fingerprints are set up for the data in the database client database and the server database respectively. The setting up data fingerprint includes the following processes. A short character string is generated based on a preset data fingerprint algorithm or a data fingerprint algorithm negotiated by the client and the server. The character string features short length and uniqueness, i.e., the character string has less than twenty bytes generally and different character strings are generated according to different data. Because length of the data fingerprints is short comparatively, the data to be transmitted by the client sending the data fingerprints to the server for verification is much less than the data transmitted by the client when all data in the client database has to be sent to the server. Even the quantity of the data characteristic information and the data to be synchronized after the verification, i.e., the data failing to the pass the verification, is less than the quantity of all data in the client database.

In the embodiment, the data fingerprints of the data in the client database and the server database are set up in advance. And the data fingerprints corresponding to data with LUIDs are stored in the database. Alternatively, the data fingerprints can be set up dynamically in data fingerprint verification stage of the client and the server, i.e., dynamically setting up the data with LUIDs. This is a two-party computation smart sync.

In embodiments of the present disclosure, alternatively the client sends the generated data fingerprint of the data to the server. And the server stores the data fingerprints of the data. Usually, data item means the whole data, including identifier, actual data, attributes etc. In this invention, this is not strictly differentiated, and data can be understood as data item. In the present disclosure, the data includes data items, files and directories. The data items are taken as the example for the detailed description of the embodiments of the present disclosure. Hence the server does not need to compute the data fingerprints, and compares the received data fingerprints with the data fingerprints stored on the server. In the above case, the client may generate the data fingerprints in the following conditions: 1) at the beginning of the data synchronization, the client generates the data fingerprints of the data items in the client database, hence the client does not need to store the data fingerprints of the data items; 2) the client database stores the data fingerprints of the data items and, upon a modification of the data item the client generates a new data fingerprint for the modified data item and updates the data fingerprints. The data synchronization in the above case is named one-party computation smart sync.

Figure 3:
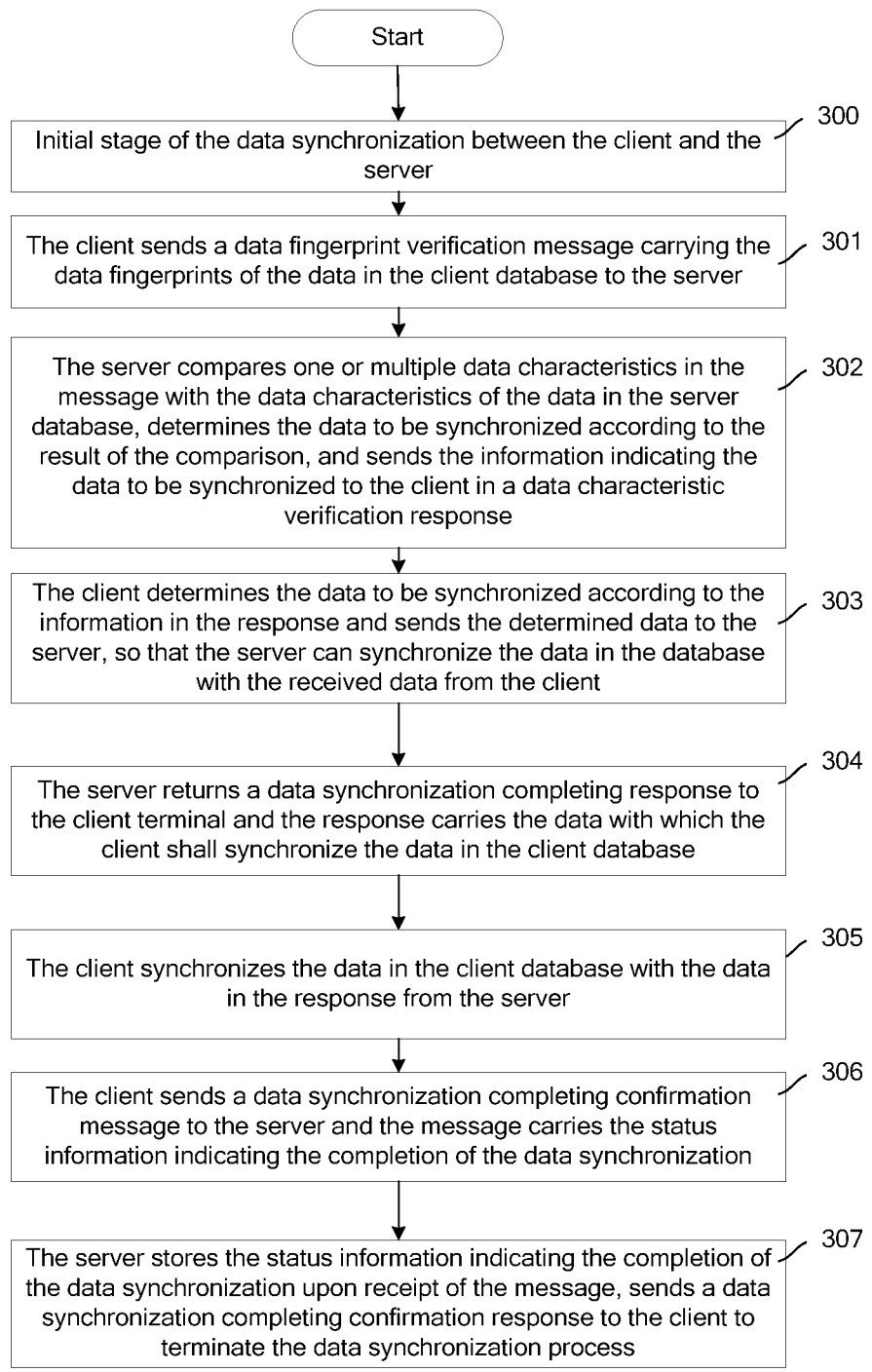
FIG. 3 is a flow chart of the data synchronization in an embodiment of the present disclosure.

FIG. 3 is a flow chart of the data synchronization in the embodiment of the present disclosure, including the following processes.

Initial Stage of Data Synchronization:

According to the processes in block 300, a client and a server enter an initial stage of data synchronization.

In this embodiment, the sync type negotiation can be negotiated in the initial stage of data synchronization, i.e., it is negotiated whether the smart sync or other sync types should be employed. In this embodiment it is supposed to employ the smart sync.

In the above processes of negotiating the data synchronization, it is further negotiated whether the one-party computation smart sync or the two-party computation smart sync should be employed.

In this embodiment, when it has been determined that the smart sync should be employed, the client and the server further determine a data fingerprint algorithm in the initial stage of the data synchronization. The client and the server can set up data fingerprints for the data in the client database and the server database according to the determined data fingerprint algorithm. The initial stage of the data synchronization in the prior art may also be adopted in the embodiment.

In this embodiment, when it is determined to employ one-party computation smart sync, the process of determining the data fingerprint algorithm can be omitted in the initial stage of the data synchronization.

Data Fingerprint Verification Stage:

According to the processes in block 301, the client sends a data fingerprint verification message to the server, and the data fingerprint verification message carries the data fingerprints of the data items of the client database.

According to the processes in block 302, the server compares one or multiple piece of data characteristic information carried in the data fingerprint verification message with the data characteristic information of the data items in the server database. And the server determines a status of the data in the client according to a result of the comparison, e.g., the server determines whether the data in the client are modified or whether a new data has been added. The server also determines the status of the data on the server according to the result of the comparison, e.g., the server determines whether the data in the server are modified or whether a new data has been added. Then the server determines the data to be synchronized based on the sync type determined in the initial stage of the data synchronization and the result of the comparison, and sends a data characteristic information verification response to the client, the data characteristic information verification response carries identification information of the data to be synchronized.

The identification information of the data to be synchronized may be LUID of the data items to be synchronized, or the data fingerprints of the data items to be synchronized, or status codes corresponding to the data fingerprints of the data items to be synchronized.

When the identification information of the data to be synchronized is the LUID, the data item corresponding to the LUID in the client database are regarded as the data to be synchronized in this embodiment. When the identification information of the data to be synchronized is the data fingerprint, the data item corresponding to the data fingerprint in the client database is regarded as the data to be synchronized in this embodiment. When the identification information of the data to be synchronized is the status code, the client determines whether the corresponding data item needs to be synchronized according to the status code in the client database, because the status code usually corresponds to LUID, the data item with the corresponding LUID in the client database is regarded as the data to be synchronized.

Data Synchronization Stage:

According to the processes in block 303, the client determines the data to be synchronized according to information in the data characteristic information verification response, and sends the data to be synchronized to the server, so that the server can update the data in the server database.

According to the processes in block 304, the server returns a data synchronization completing response to the client, and the data synchronization completing response carries the data based on which the client shall synchronize the data in the client database.

According to the processes in block 305, the client synchronizes the data in the client database with the data carried in the data synchronization completing response from the server.

Completing Stage of Data Synchronization:

According to processes in block 306, the client sends a data synchronization completing confirmation message to the server, the data synchronization completing confirmation message carries status information of the synchronization, e.g., Anchor or data fingerprints of the data in the client database.

According to processes in block 307, the server stores the status information of the synchronization upon receiving the data synchronization completing confirmation message, and sends a data synchronization completing confirmation response to the client to finish the data synchronization. Alternatively the server compares the received status information of the synchronization with status information of the synchronization in the server database, if the received status information of the synchronization is not identical with the status information of the synchronization in the server database, the processes in block 302 and the follow-up processes will be performed (not show in FIG. 3); otherwise the server returns a data synchronization completing confirmation response to the client to finish the data synchronization (not show in FIG. 3).

In this embodiment of the present disclosure, the data synchronization may be performed between the client and the server without the processes in block 306 and block 307.

Several ways can be taken in this embodiment to ensure that the same data items have the same data fingerprints in both the client database and the server database. The first way is the one-party computation smart sync, in which the client makes a computation to generate data fingerprints of the data items in the client database and sends the data fingerprints generated to the server; and the server stores the received data fingerprints in corresponding data items in the server database. The second way is the two-party computation smart sync, in which the client and the server both make a computation according to the same data fingerprint algorithm to generate data fingerprints of the data items in the client database and server database respectively. The above-mentioned two sync types are described in detail hereafter.

One-Party Computation Smart Sync:

For some type of data, its data fingerprints should be computed by the client and stored in the server for the following reasons: the client and the server may store the same data item with different field orders, different coding patterns and storing formats, which results in different data fingerprints generated by the client and the server respectively for the same data item, and further results in a data fingerprint verification failure in the data synchronization. For example, a phone number +86-755-28974150 in a vCard may be stored as 86-755-28974150 in the client; or, time values 06/04/05 and 06-04-05 indicating the same date, will generate different data fingerprints because the above values are in different storing formats.

In the above case, the client sends the data fingerprints corresponding to the data items to the server through a synchronization message, e.g., Add, Replace, Copy or Move, and the server stores the data fingerprints in the server database in corresponding data items.

In order to implement the one-party computation smart sync, the client and the server have to negotiate the sync type in advance, e.g., in the initial stage or another stage of the data synchronization.

Figure 4:
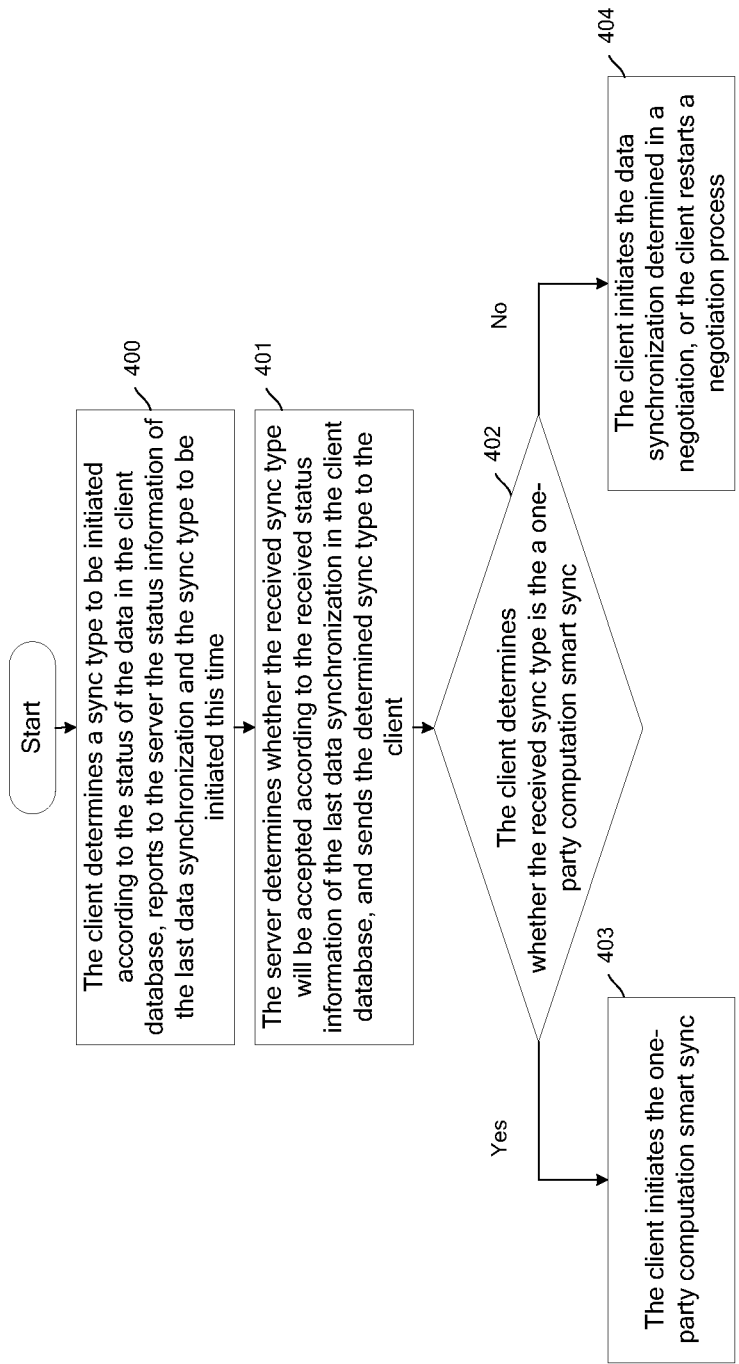
FIG. 4 is a flow chart of negotiating to adopt one-party computation smart sync in an embodiment of the present disclosure.

FIG. 4 is a flow chart of negotiating to adopt one-party computation smart sync in embodiment of the present disclosure, and the flow chart includes the following processes.

According to processes in block 400, a client determines a sync type to be initiated according to status of data in the client database, reports status information of the last data synchronization and the sync type to be initiated this time to a server.

According to processes in block 401, the server determines whether the received sync type will be accepted according to the received status information of the last data synchronization in the client database, and sends the determined sync type to the client.

According to processes in block 402, the client determines whether the received sync type is one-party computation smart sync, and if yes, the processes in block 403 are performed; otherwise the processes in block 404 are performed.

According to processes in block 403, the client determines to adopt the one-party computation smart sync this time.

According to processes in block 404, the client initiates a data synchronization determined in a negotiation, or the client restarts a negotiation process.

In this embodiment of the present disclosure, user may choose any sync type and notify the client to adopt the sync type chosen by the user. The client will check status of data in the client database before the client determines whether to initiate the sync type chosen by the user, or initiate a data synchronization in which the client database can be put back into order (e.g., an one-party computation smart sync or a slow sync).

The process of checking status of data in the client database by the client includes the following processes. The client checks whether data fingerprint generation method in the client database has been changed, checks whether LUIDs in the client database are out of order or/and re-generated, and checks whether modification status information of the data in the client database is lost.

When the client detects that the data fingerprint generation method in the client database has been changed, i.e., algorithm or method used for generating data fingerprints has been changed, the client will initiate a slow sync, no matter what sync type the client requests. When the client detects that the data fingerprint generation method remains unchanged, the client further checks the status of the client database to determine that the one-party computation smart sync should be initiated, or to determine that a sync type requested by the client should be initiated.

When the client detects that the data fingerprint generation method remains unchanged, but the LUIDs in the client database are out of order or/and re-generated, or/and the modification status information of the data in the client database is lost, the client may initiate the one-party computation smart sync.

When the client detects that the data fingerprint generation method remains unchanged, but the LUIDs in the client database are in order or/and not regenerated, and no modification status information of the data in the client database is lost, the client may initiate the one-party computation smart sync or the sync type requested by the client.

When the server detects that no mapping table in the server database is lost, no stored data fingerprint is lost and the data fingerprint generation method remains unchanged, the server will further check whether the last data synchronization fails according to the received status information of the last data synchronization in the client database; if yes, the server may request, through a response message, the client to initiate the one-party computation smart sync.

If the server detects that the mapping table in the server database is lost, or/and the modification status information in the server database is lost, yet no data fingerprint in the server database is lost, the server may request, through a response message, the client to initiate the one-party computation smart sync.

When the server detects that the mapping table in the server database is lost and the data characteristic information in the server database is also lost, the server may request, through a response message, the client to initiate the slow sync.

When the server detects that the data fingerprint generation method has been changed, the server may request, through a response message, the client to initiate the slow sync.

The sync type determined by the client and the sync type determined by the server are shown in Tables 2 and 3.

TABLE 2 the sync type determined by the client

| Data fingerprint generation method has been changed | LUIDs are out of order or/and regenerated | Change Log lost | Sync type |
| --- | --- | --- | --- |
| No | Yes | No | One-party computation smart sync 1 |
| No | No | Yes | One-party computation smart sync 2 |
| No | Yes | Yes | One-party computation smart sync 1 |
| Yes | / | / | Slow sync |

TABLE 3 the sync type determined by the server

| Status information of the last data synchronization indicates a failure or the Change Log on the server is lost | Mapping table in the server database is lost | Data fingerprints in the server database are lost | Data fingerprint generation method has been changed in the client database | Sync type |
| --- | --- | --- | --- | --- |
| Yes | No | No | No | One-party computation smart sync 2 |
| No | Yes | No | No | One-party computation smart sync 1 |
| No | Yes | Yes | No | Slow sync |
| No | Yes | Yes | Yes | Slow sync |

The server may determine whether the last data synchronization failed according to the status information of the last data synchronization in the following two ways.

In the first way, the status information of the last data synchronization from the client is the Anchor of the client database.

Therefore the process of determining by the server whether the last data synchronization failed includes the following processes. The server compares the Anchor sent from the client this time with the Anchor stored in the server database, and the above mentioned Anchor stored in the server database was sent from the client in the last data synchronization process. If the Anchor from the client this time is identical with the Anchor stored in the server database, the server determines that the last data synchronization was successful; otherwise, the server determines that the last data synchronization was failed.

In the second way, the status information of the last data synchronization from the client is data characteristic information generated for the client database according to a predetermined data characteristic information algorithm.

Therefore the process of determining by the server whether the last data synchronization was failed includes the following processes. The server compares the data characteristic information of the client database from the client this time with the data characteristic information of the client database in the server database, and the above mentioned data characteristic information of the client database in the server database was sent from the client in the last data synchronization process. If the data characteristic information of the client database from the client this time is identical with the data characteristic information of the client database in the server database, the server determines that the last data synchronization succeeded; otherwise, the server determines that the last data synchronization failed.

In the second way, the process of generating the data characteristic information for the client database according to the predetermined data characteristic information algorithm further includes the following processes. The client makes a computation to generate the data characteristic information for the client database according to the predetermined data characteristic information algorithm with the data characteristic information of all directories in the client database and/or LUIDs of all data in the directory as inputted elements. Alternatively, the client makes a computation to generate the data characteristic information for the client database according to the predetermined data characteristic information algorithm with the data characteristic information of all directories in the client database, and/or the data characteristic information of the data in the directory as the inputted elements. Alternatively, the client makes a computation to generate the data characteristic information for the client database according to the predetermined data characteristic information algorithm with the data characteristic information and/or corresponding LUIDs of all data in the client database as the inputted elements.

The client and the server in this embodiment also can make an appointment in advance to initiate the one-party computation smart sync to synchronize all data, data of all types, data of certain type(s) or data within certain value threshold(s) in the client database and server database.

The embodiment of the present disclosure mainly deals with the malfunctions in the client during the data synchronization process. And the malfunctions in the server can be handled in the same way used for handling malfunctions in the client. The malfunctions in the client mainly include the following two problems.

1) LUIDs are out of order or/and re-generated.

In such case, the LUIDs of the data in the server database are invalidated, causing the data items in the client database and the server database only correspond to each other according to the data fingerprints.

The case of the mapping table in the server database being lost is similar to the above-mentioned problem one.

2) The Change Log is lost, i.e., data modification status information is lost, and the case of Anchor in the client database being conflicting with that in the server database is similar to the above-mentioned problem two.

Due to the second problem, it is impossible to get the data item status in the client database and in the server database, for example, whether the data is synchronized or not, whether the data is modified or not.

The loss of Change Log in the server database brings up the same problem as the loss of Change Log in the client database. The case of the server detecting that the last data synchronization failed, and all other status information having normal value, equals the case of the loss of the Change log in the client database.

The possible status of the data in the client database according to the above-mentioned analysis is shown in Table 4:

TABLE 4

| | status of the data in the client database | | |
|---|---|---|---|
| Situation | LUIDs are out of order or/ and regenerated | Change Log is lost | Status |
| 1 | No | Yes | Abnormal |
| 2 | Yes | No | Abnormal |
| 3 | Yes | Yes | Abnormal |
| 4 | No | No | Normal |

The first situation shown in Table 4 is that the LUIDs are in normal status while the Change Log is lost. In such situation, the corresponding relations between the data items in the client database and the data items in the server database are not lost, however the client is unable to determine whether the data items are modified and unable to determine what modification has been made to the data items. In such situation, the corresponding relations between data items can be obtained according to the LUIDs sent from the client. The server, upon receiving the LUID-fingerprint mapping from the client, compares the received data fingerprints with the data fingerprints of the data items with the same LUIDs in the server database, and determines whether the corresponding data items in the server database should be synchronized.

The second situation in Table 4 is that the LUIDs are invalidated while the Change Log remains intact. In such situation, corresponding relations between the data items in the client database and the data items in the server database are lost, but the client is able to determine whether the data items are modified, and determine what modification is made to the data items. The data fingerprints of the modified data items in the client database need not to be sent to the server, because no matching data fingerprints will be found in the server database. So the client may reduce the data fingerprints to be sent in the data fingerprint verification stage, and the server accordingly reduces the data fingerprints to be compared.

The third situation in Table 4 is that the LUIDs are invalidated while the Change Log is lost. In such situation, the corresponding relations between the data items in the client database and the data items in the server database are lost, and the client is unable to determine whether the data items are modified and to determine what modification is made to the data items. The optimized procedures in the above-mentioned situations cannot be applied to the third situation, and the client has to send the data fingerprints of all data to be synchronized.

In order to simplify the processes, the second and the third situations in Table 4 can be combined into one situation, and the procedure for handling the third situation is also used for handling the second situation.

In the fourth situation in Table 4, the client works properly and the client may initiate the smart sync or other types of synchronization.

To sum up, in the embodiment of the present disclosure, ordered LUIDs can be used to simplify the data fingerprint comparison processes, and the Change Log can be used to reduce the data fingerprints to be transmitted.

The data synchronization processes are further described with reference to the above-mentioned first and second situations shown in Table 4.

In the first situation shown in Table 4, the data synchronization processes in the embodiment include the following steps.

Step 1: A client, after a negotiation with a server, determines to employ one-party computation data synchronization in the first situation shown in Table 4.

Step 2: The client sends LUID-fingerprints of all data in the client database to the server.

Step 3: Upon receiving the LUID-fingerprints, the server determines the data items corresponding to the LUIDs according to the LUID-GUID mapping relations and the GUID-fingerprint mapping relations stored in the server, compares the data fingerprints of corresponding data items in the server database with the data fingerprints from the client, and determines the data items to be synchronized.

Step 4: The server returns the LUIDs of the data items to be synchronized to the client.

There are two approaches to perform the foregoing steps: Approach A) the server modifies a data item in the server database and removes the original data fingerprint of the data item; Approach B) the server modifies a data item in the server database, inserts an identification bit for the original data fingerprint of the data item, stores original data fingerprints for comparison in the following processes, and the identification bit indicates that the data fingerprint is modified or invalidated.

Figure 5:
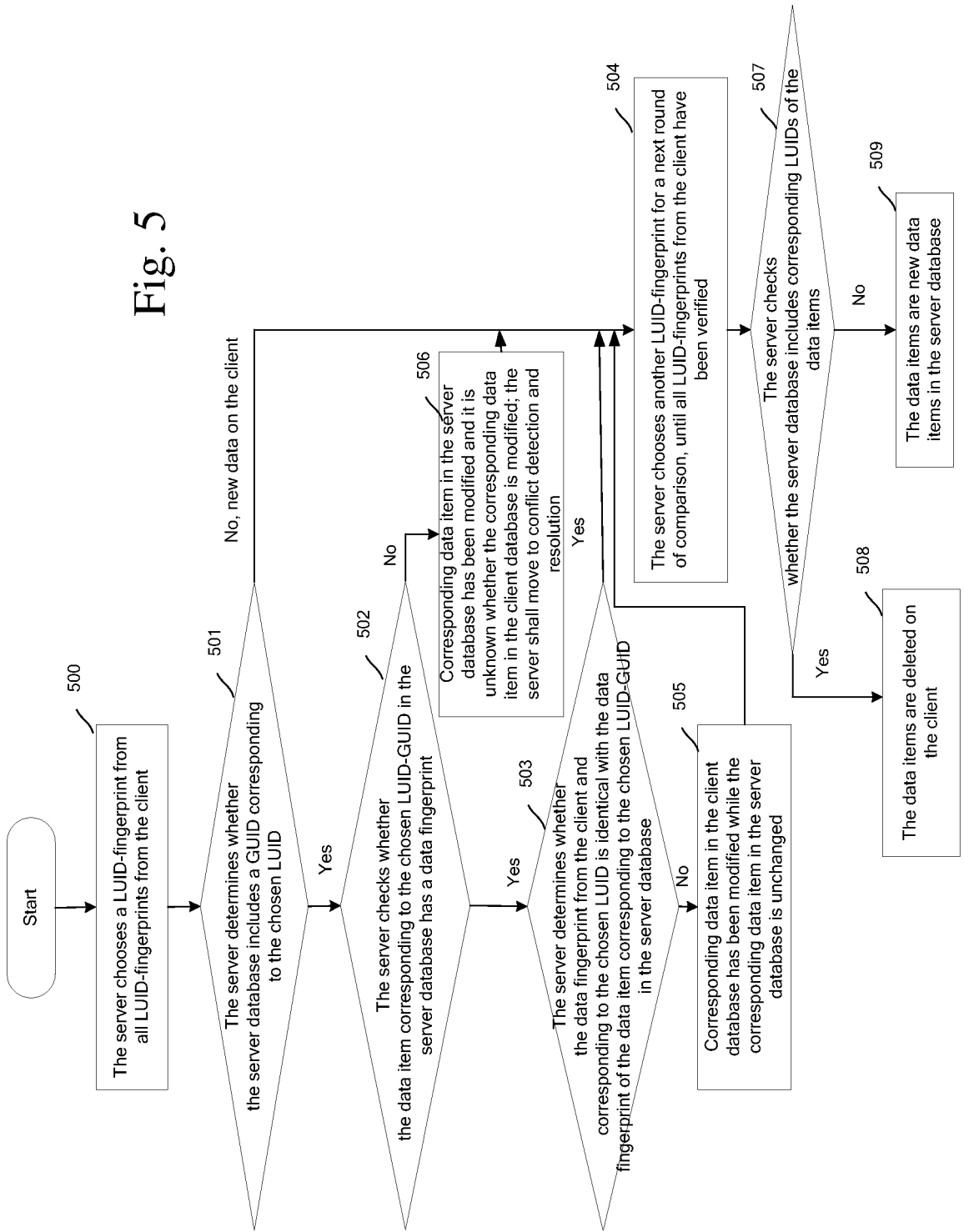
FIG. 5 is a flow chart of the data fingerprint comparison performed by the server in Approach A in the first situation shown in Table 4 in an embodiment of the present disclosure.

FIG. 5 is a flow chart of the data fingerprint comparison performed by the server in Approach A in the first situation shown in Table 4 in the embodiment, and the flow includes the following processes.

According to processes in block 500, the server chooses a LUID-fingerprint from all LUID-fingerprints from the client.

According to processes in block 501, the server determines whether the server database includes a GUID corresponding to the chosen LUID, and if yes, processes in block 502 are performed; otherwise, the server determines that the LUID corresponds to a new data item in the client database and processes in block 504 are performed.

According to processes in block 502, the server checks whether the data item corresponding to the chosen LUID-GUID in the server database has a data fingerprint; if yes, processes in block 503 are performed; otherwise, processes in block 506 are performed.

According to processes in block 503, the server determines whether the data fingerprint from the client and corresponding to the chosen LUID is identical with the data fingerprint of the data item corresponding to the chosen LUID-GUID in the server database; if yes, the server determines that the corresponding data items in the client database and the server database are identical and are unchanged, processes in block 504 are performed; otherwise, processes in block 505 are performed.

According to processes in block 504, the server chooses another LUID-fingerprint for a next round of comparison, until all LUID-fingerprints from the client have been verified, and then processes in block 507 are performed.

According to processes in block 505, corresponding data items in the client database have been modified, and the corresponding data item in the server database is unchanged, processes in block 504 are performed.

According to processes in block 506, corresponding data items in the server database have been modified, and it is unknown whether the corresponding data item in the client database is modified; the server shall move to conflict detection and resolution; processes in block 504 are performed.

According to processes in block 507, for the data items in the server database that correspond to no LUID-fingerprints from the client, the server checks whether the server database includes corresponding LUIDs of the data items; if yes, processes in block 508 are performed, otherwise, processes in block 509 are performed.

According to processes in block 508, the server determines that the data items are deleted on the client, and the comparison process terminates.

According to processes in block 509, the server determines that the data items are new items in the server database, and the comparison process terminates.

The results of the comparison process in FIG. 5 are shown in Table 5.

TABLE 5 results of the data fingerprint comparison in Approach A

| Situation | Mapping | Data fingerprint comparison | Result |
| --- | --- | --- | --- |
| Block 503 | LUID mapping object found | Identical data fingerprints | Corresponding data items are unchanged on the client and on the server |
| Block 505 | LUID mapping object found | Different data fingerprints, and the server database includes corresponding data fingerprint | The corresponding data item is modified on the client and unchanged on the server |
| Block 506 | LUID mapping object found | Different data fingerprints, and the server database includes no corresponding data fingerprint | The modification status of corresponding data item on the client is unknown while the data item is modified on the server, conflict detection is needed |
| Block 504 | No object found in LUID mapping relations | / | New data on the client |
| Block 509 | Data without mapping relations on the server | / | New data on the server |

TABLE 5-continued results of the data fingerprint comparison in Approach A

| Situation | Mapping | Data fingerprint comparison | Result |
|---|---|---|---|
| Block 508 | Data with LUIDs on the server, yet no corresponding data fingerprint found in the data fingerprints from the client | / | Data deleted by the client |

Finally the server returns a response to the client. That is, the server returns one of the following in a response message: data modified by the client, the new data on the client, and the LUIDs, data fingerprints or status codes of the data required by the server after the conflict detection to the client. The client sends, to the server according to the response, the data required to be synchronized. During or after the data synchronization on the server, the server sends the new data, or modified data, or the data required by the client after the conflict detection, to the client, so that the client can synchronize the data in the client database.

Figure 6:
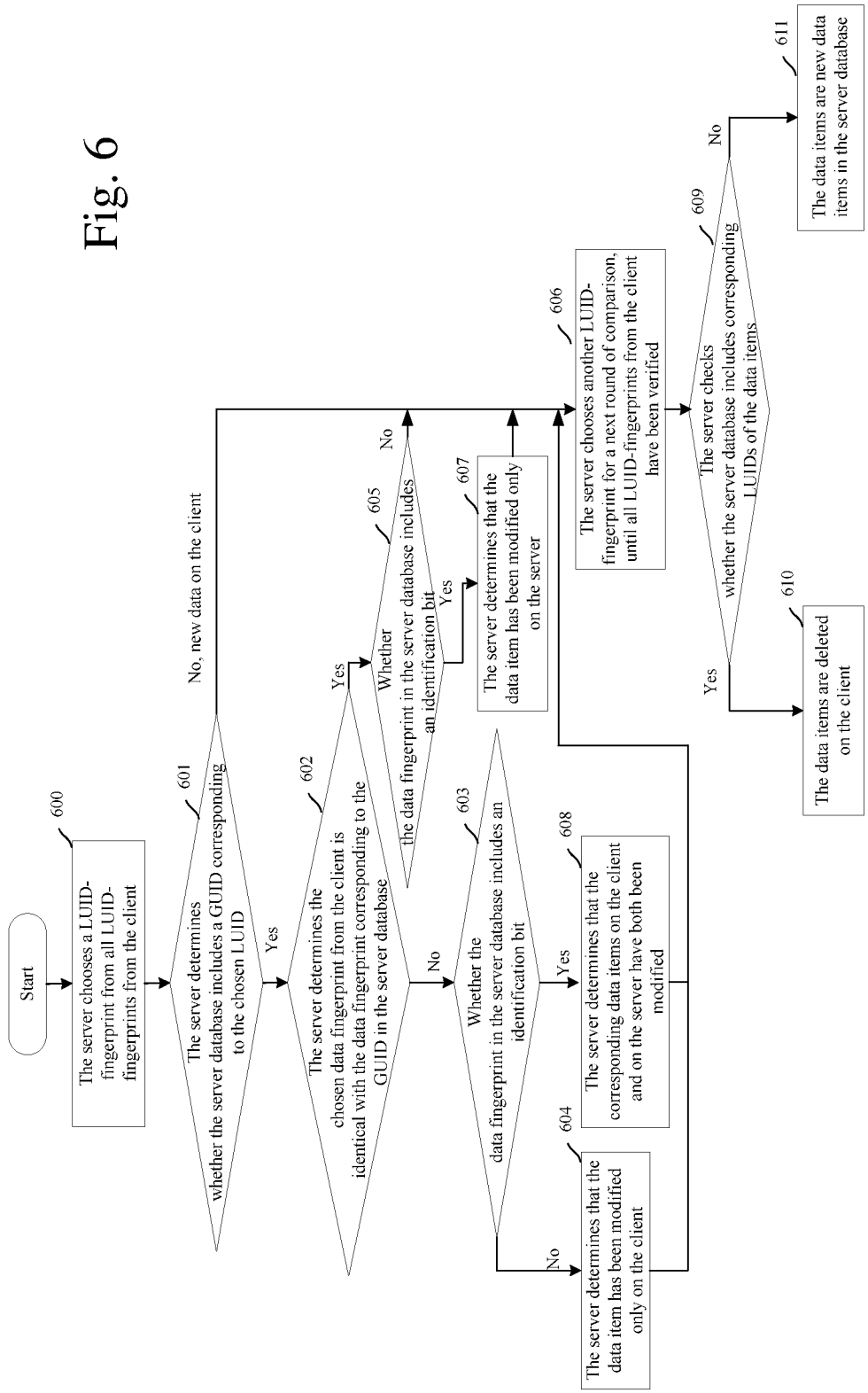
FIG. 6 is a flow chart of the data fingerprint comparison performed by the server in Approach B in the first situation shown in Table 4 in an embodiment of the present disclosure.

FIG. 6 is a flow chart of the data fingerprint comparison performed by the server in Approach B in the first situation shown in Table 4 in the embodiment, and the flow includes the following processes.

According to processes in block 600, the server chooses a LUID-fingerprint from all LUID-fingerprints from the client.

According to processes in block 601, the server determines whether the server database includes a GUID corresponding to the chosen LUID, and if yes, processes in block 602 are performed; otherwise, the server determines that the LUID corresponds to a new data item in the client database and processes in block are performed.

According to processes in block 602, the server determines whether the chosen data fingerprint from the client is identical with the data fingerprint corresponding to the GUID in the server database, if no, processes in block 603 are performed; otherwise, processes in block 605 are performed.

According to processes in block 603, the server determines whether the data fingerprint in the server database includes an identification bit indicating that corresponding data item has been modified, if no identification bit is found, processes in block 604 are performed; otherwise, processes in block 608 are performed.

According to processes in block 604, the server determines that the data item has been modified only on the client, and processes in block 606 are performed.

According to processes in block 605, the server determines whether the data fingerprint in the server database includes an identification bit indicating that corresponding data item has been modified, if no identification bit is found, the corresponding data items in the client database and in the server database are regarded as unchanged and processes in block 606 are performed; otherwise processes in block 607 are performed.

According to processes in block 606, the server chooses another LUID-fingerprint for a next round of comparison until all LUID-fingerprints from the client have been verified, and processes in block 609 are performed.

According to processes in block 607, the server determines that the data item has been modified only on the server, and processes in block 606 are performed.

According to processes in block 608, the server determines that the corresponding data items on the client and on the server have both been modified and conflict detection and resolution are needed, then processes in block 606 are performed.

According to processes in block 609, for the data items in the server database that correspond to no LUID-fingerprints from the client, the server determines whether the server database includes corresponding LUIDs of the data items; if yes, processes in block 610 are performed, otherwise, processes in block 611 are performed.

According to processes in block 610, the server determines that the data items are deleted on the client, and the comparison process terminates.

According to processes in block 611, the server determines that the data items are new items in the server database, and the comparison process terminates.

The results of the comparison process in FIG. 6 are shown in Table 6.

TABLE 6

Results of the data fingerprint comparison in Approach B

| Situation | Mapping | Data fingerprint comparison | Result |
|---|---|---|---|
| Block 605 | LUID mapping object found | Identical data fingerprints | Corresponding data items are unchanged on the client and on the server |
| Block 607 | LUID mapping object found | Identical data fingerprints with a modification identification bit in the data fingerprint on the server | The corresponding data item is unchanged on the client and modified on the server |
| Block 604 | LUID mapping object found | Different data fingerprints with no modification identification bit in the data fingerprint on the server | The corresponding data item is modified on the client and unchanged on the server |
| Block 608 | LUID mapping object found | Different data fingerprints with a modification identification bit in the data fingerprint on the server | The server determines that the corresponding data items on the client and on the server have both been modified and conflict detection and resolution are needed. |
| Block 606 | No object found in LUID mapping | / | New data on the client |
| Block 611 | Data with no mapping relations on the server | / | New data on the server |

TABLE 6-continued

Results of the data fingerprint comparison in Approach B

| Situation | Mapping | Data fingerprint comparison | Result |
|---|---|---|---|
| Block 610 | Data with LUIDs on the server, yet no corresponding data fingerprint found in the data fingerprints from the client | / | Data deleted by the client |

In the second situation shown in Table 4, the data synchronization processes in the embodiment includes the following steps.

Step 1: A client, after a negotiation with a server, determines to employ one-party computation data synchronization in the second situation shown in Table 4, and further determines the data fingerprints to be transmitted according to status information of the data items in the client database.

Step 2: The client sends the to-be-transmitted data fingerprints of the data items in the client database to the server.

Step 3: Upon receiving the data fingerprints from the client, the server compares the data fingerprints from the client with the data fingerprints of the data items in the server database, and determines the data items to be synchronized.

Step 4: The server returns the data fingerprints or status codes of the data items to be synchronized to the client.

In the embodiment of the present disclosure, the client may determine the to-be-transmitted data fingerprints according to the following rules.

Rule a: when a data item includes a modification status identification, e.g., is Add, Delete or Modify identification, the LUID-fingerprint of the data item is transmitted to the server;

Rule b: when a data item includes no modification status identification, the LUID-fingerprint of the data item is transmitted to the server, or the LUID-fingerprint of the data item is not transmitted to the server.

Figure 7:
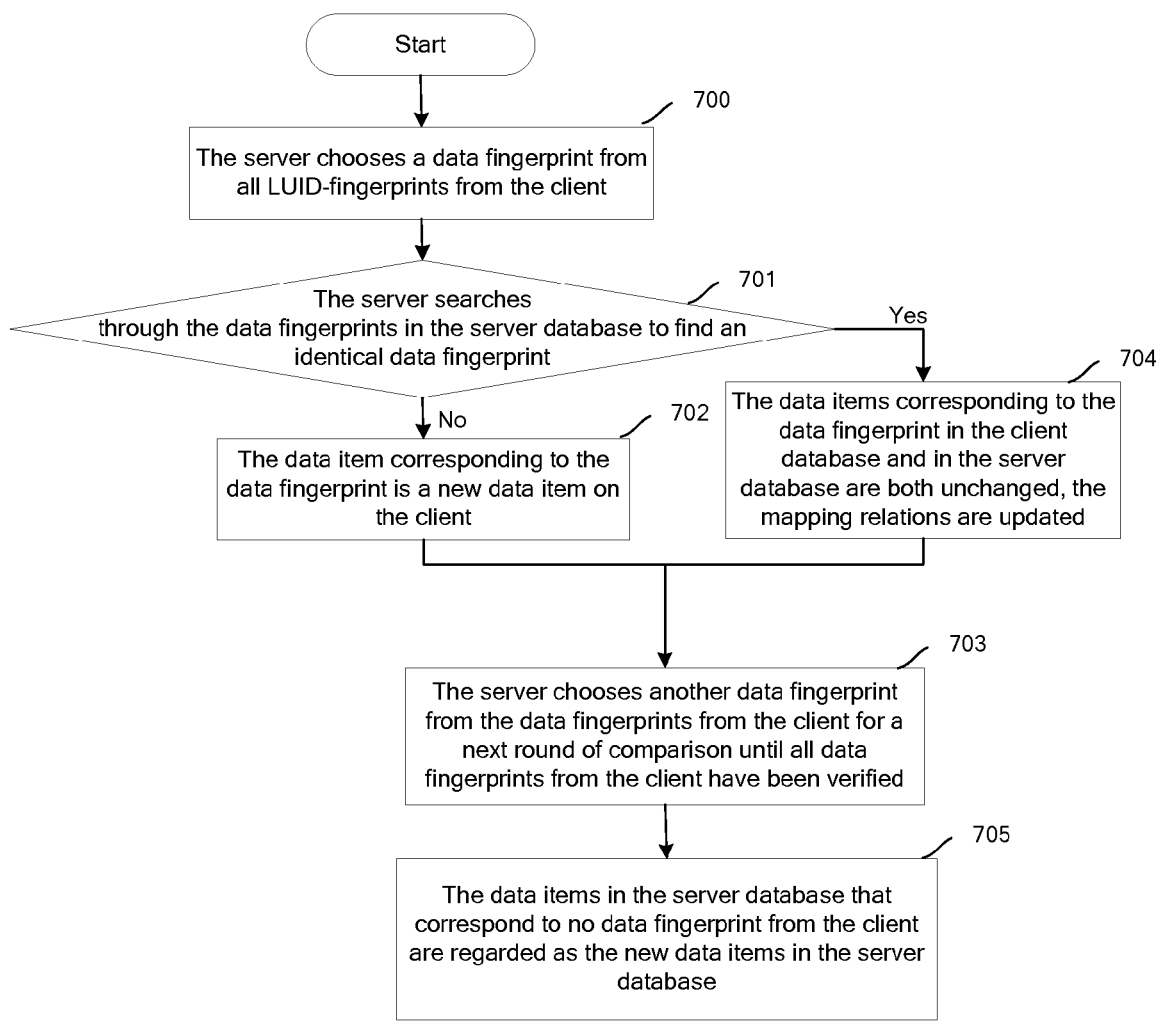
FIG. 7 is a flow chart illustrating the process of determining by the server the data items to be synchronized in the second situation shown in Table 4 in an embodiment of the present disclosure.

When the server modifies a data item in the server database and removes corresponding data fingerprint, a workflow shown in FIG. 7 is needed. FIG. 7 is a flow chart illustrating the process of determining by the server the data items to be synchronized in the second situation shown in Table 4. And the FIG. 7 includes the following processes.

According to processes in block 700, a server chooses a data fingerprint from all LUID-fingerprints from a client.

According to processes in block 701, the server searches the data fingerprints in the server database for an identical data fingerprint, if no identical data fingerprint is found, processes in block 702 are performed; otherwise, processes in block 704 are performed.

According to processes in block 702, the server determines that the data item corresponding to the data fingerprint is a new data item on the client, and processes in block 703 are performed.

According to processes in block 704, the data items corresponding to the data fingerprint in the client database and in the server database keep unchanged, the mapping relations are updated, and processes in block 703 are performed.

According to processes in block 703, the server chooses another data fingerprint from the data fingerprints from the client for a next round of comparison until all data fingerprints from the client have been verified, then processes in block 705 are performed.

According to processes in block 705, the data items in the server database that correspond to no data fingerprint from the client are regarded as the new data in the server database, and the comparison process is terminated.

The results of the comparison process in FIG. 7 are shown in Table 7.

TABLE 7 data fingerprint comparison result generated by the server in the second situation shown in Table 4

| Situation | Identical Data Fingerprint | Result |
|---|---|---|
| Block 704 | Identical data fingerprint found | The data items corresponding to the data fingerprint in the client database and in the server database are both unchanged and the mapping relations shall be updated. |
| Block 702 | Identical data fingerprint not found | New data on the client |
| Block 705 | Data with no matching data fingerprints on the server | New data on the server |

When the server modifies a data item in the server database, the server inserts an identification bit into the original data fingerprint of the data item, and stores the original fingerprint. And the identification bit indicates that the data fingerprint has been modified or invalidated. The flow shown in FIG. 7 can also be used for a more accurate data fingerprint comparison, and can further solve the problem of synchronizing the duplicate data item. For example, in Table 7, when the server finds no data fingerprint in the server database that is identical with a data fingerprint from the client, the server will determine that a new data item is added on the client, which may result in duplicate data item because the data fingerprint may correspond to a data item that is unchanged on the client but modified on the server. If the server stores the original data fingerprint of a modified data item and inserts a modification identification into the original data fingerprint, it can correctly determined by the server that the data fingerprint just corresponds to a modified data item on the server database, therefore the synchronization for the duplicated data item is avoided.

In the embodiment of the present disclosure, the smart sync types can be added into the data synchronization protocol and identified with status codes, as shown in Table 8.

TABLE 8 new smart sync

| Status code of smart sync | Name | Description |
|---|---|---|
| 211 | Smart sync 1 | 1. The client generates data fingerprints and sends the data fingerprints to the server for recording<br>2. LUIDs are out of order or/and regenerated |
| 212 | Smart sync 2 | 1. The client generates data fingerprints and sends the data fingerprints to the server for recording<br>2. The Change Log of the data is lost |
| 213 | Smart sync 3 | 1. The client and the server generate data fingerprints for their own databases respectively<br>2. LUIDs are out of order or/and regenerated |

TABLE 8-continued new smart sync

| Status code of smart sync | Name | Description |
|---|---|---|
| 214 | Smart sync 4 | 1. The client and the server generate data fingerprints for their own databases respectively<br>2. The Change Log of the data is lost |

With the smart sync in the data synchronization protocol, the client sends a Negotiate Data Synchronization command to the server in the following format:

```
< negotiation for sync type >
...
< sync type >smart sync 1</sync type >
...
</ negotiation for sync type >
```

In practical applications, the negotiation may be initiated by the <Alert> command in the data synchronization process, and an example of the <Alert> command from the client to the server for a data synchronization in the smart sync 1 is as follows:

```
<SyncML>
  <SyncHdr>
  ...
  </SyncHdr>
  <SyncBody>
    <Alert>
      <CmdID>1</CmdID>
      <Data>211</Data> <!- Smart Sync 1 -->
      ...
    </Alert>
    ...
</SyncML>
```

And the <Alert> command from the server to the client for data synchronization in smart sync 1 is as follows:

```
<SyncML>
  <SyncHdr>
  ...
  </SyncHdr>
  <SyncBody>
    <Status>...</Status>
    <Alert>
      <CmdID>3</CmdID>
      <Data>211</Data>
      .....
    </Alert>
    .....
</SyncML>
```

In another embodiment of the present disclosure, only a smart sync is added into the data synchronization protocol, and the Negotiate Data Synchronization command identifies a data fingerprint generation method and the reason for initiating the data synchronization. In this embodiment, the Negotiate Data Synchronization Type command from the client to the server is as follows:

```
< negotiation for type of synchronization >
...
< type of synchronization >smart sync</ type of synchronization >
<data fingerprint generation method>generated by the client and stored by the server</data fingerprint generation method>
<reason code>code of the reason for initiating smart sync</reason code>
...
</ negotiation for type of synchronization >
```

In order to make it convenient for the data synchronization command to carry parameters used for the smart sync, a new sync type can be added into the standards of the prior art to indicate the smart sync, and new codes can be added to indicate the data fingerprint generation method and the reason for initiating the smart sync, as shown in Table 9.

TABLE 9 new codes for data fingerprint generation methods and reasons for initiating smart sync

| Status code | Function |
|---|---|
| 501 | Data fingerprints shall be generated by the client and stored by the server |
| 502 | Data fingerprints shall be generated by the client and the server respectively |
| 503 | Reason for initiating synchronization: LUID out of order/regenerated |
| 504 | Reason for initiating synchronization: data Change Log lost |

In practical applications, the negotiation may be initiated by a <Alert> command in the data synchronization process, and an example of the <Alert> command from the client to the server for smart sync 1 is as follows.

```
<SyncML>
  <SyncHdr>
  ...
  </SyncHdr>
  <SyncBody>
    <Status>....</Status>
    <Alert>
      <CmdID>3</CmdID>
      <Data>211</Data>
      <FPGen>501</FPGen>
    <Reason>503</Reason>
      .....
    </Alert>
    .....
</SyncML>
```

The process of sending data fingerprints and obtaining verification result is described in the embodiment of the present disclosure.

The client may send the LUIDs and data fingerprints of the data items in the client database via a <Fingerprint> command to the server. The format of the command includes, but is not limited to, the following two formats.

```
Format 1: <Fingerprint>
  <LUID>011</LUID>
  <Data>LKSDJLFJSLDJSDJL</Data>
</Fingerprint>
<Fingerprint>
  <LUID>012</LUID>
  <Data>JLSDJOTOEWJFLS</Data>
</Fingerprint>
```

-continued

```
Format 2: <Fingerprint>
   011:LKSDJLFJSLDJSDJL;
   012:JLSDJOTOEWJFLS
</Fingerprints>
```

The process of returning the data fingerprint verification response by the server to the client may be performed according to, but not limited to, the following three methods.

The first method includes the following processes. A server returns a client a list of LUIDs and/or data fingerprints indicating the data items to be transmitted by the client to the server.

In practical applications, the list can be carried by a <Status> command, and the command may be in, but is not limited to, the following format:

<Status>
   LUID: data fingerprint verification status code; LUID data fingerprint verification status code
   </Status>

Or the <Status> command may only include the LUIDs.

The second method includes the following the processes. The server returns data fingerprint verification results for all data fingerprints from the client.

In practical applications, the list can be carried by a <Status> command, and the command may be in, but is not limited to, the following format:

```
<Status>
   <LUID>011</LUID>
   <Data>217</Data>
</Status>
<Status>
   <LUID>012</LUID>
   <Data>218 </Data>
</Status >
```

The third method includes the following processes. A server returns data fingerprint verification results for all data fingerprints from the client, and the LUIDs and/or data fingerprints with the same data fingerprint verification results are arranged into a list. That is, the commands for the LUIDs and/or data fingerprints with the same data fingerprint verification results can be combined, which can reduce the volume of the data to be transmitted.

In practical applications, the list can be carried by a <Status> command, and the command may be in, but is not limited to, the following format.

```
<Status>
   <LUID>011; 013</LUID>
   <Data>217</Data>
</Status>
<Status>
   <LUID>012;014</LUID>
   <Data>218 </Data>
</Status >
```

The present disclosure is further described with reference to the following four embodiments.

In the following four embodiments, the server has modified some data items in the server database and has removed the corresponding data fingerprints stored.

Embodiment 1 is described as follows, which is an embodiment of the present disclosure in the first situation shown in Table 4.

Figure 8A:
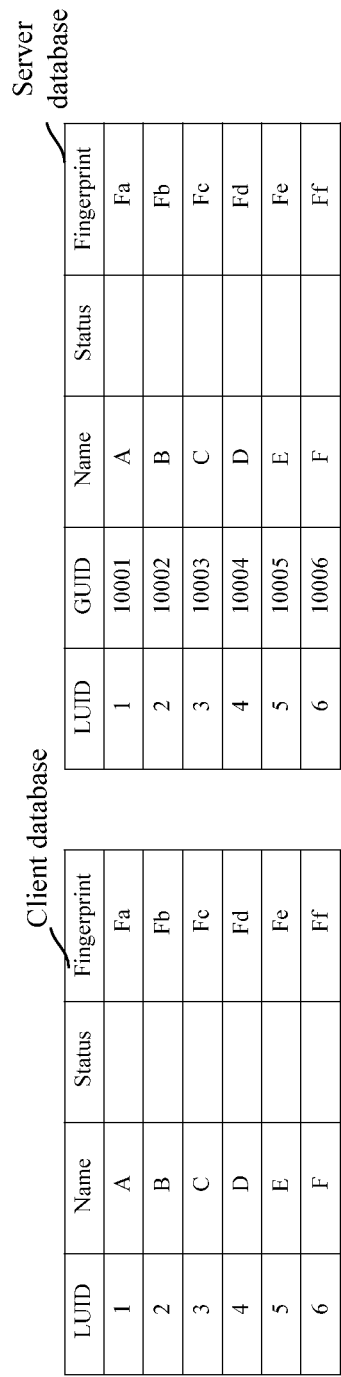
FIG. 8a is a schematic illustrating initial status of the data items in the client database and the server database in an embodiment of the present disclosure.

At first, initial states of the data items in the client database and in the server database are shown in FIG. 8a.

After a period of time, the data items in client database and the server database are modified as shown in FIG. 8b.

Next, the Change Log of the data items in the client database is lost, as shown in FIG. 8c.

At last, the data fingerprints are compared.

Step A: The client detects that the Change Log of the data items in the client database is lost. In initial stage of the data synchronization, the client sends the server a request for initiating smart sync with a reason value indicating that Change Log is lost.

Step B: The server returns a smart sync confirmation message.

Step C: The client sends the server the LUID-fingerprints of the data items in the client database, the LUID-fingerprints include {<1,Fa><2,Fb'><3,Fc><4,Fd'><6,Ff><7,Fh>}.

Step D: Upon receiving the LUID-fingerprints from the client, the server performs comparison as follows.

Server database <1, Fa><2, Fb><3, →<4, →<5, Fe>
   Client database <1, Fa><2, Fb'><3, Fc><4, Fd'><6, Ff><7, Fh>

Results of the comparison include: data item 1, no data synchronization needed; data item 2, data synchronization needed; data item 3, because the server is unable to determine whether the data item has been modified or not on the client, a conflict policy is configured to determine which of the server and the client wins in the conflict resolution, and if the server wins, no data synchronization is needed; data item 4, dependent on the conflict policy; data item 5, the server detects that no data fingerprint is transmitted from the client for the data item 5 and thus determines that the client has deleted the data item, so the server will also delete the data item; data item 6, the server detects that the data fingerprint of the data item 6 has been deleted on the server, so the server will send a deleting command to the client in the data synchronization stage to delete the data item on the client; data item 8, the server detects no data fingerprint for comparison on the server and thus determines that the data item is a new data item on the server.

Step E: The server returns to the client a set of the data items to be synchronized, that is <2, 3 ?, 4 ?, 6, 7>.

Step F: The client initiates the data synchronization according to the data item set from the server.

Step G: In the completing stage of the data synchronization, the client returns the data fingerprint of 10008 to the server, the server stores the data fingerprint and returns a storing data fingerprint confirmation message to the client.

FIG. 8d shows the data items in the client database and the server database after the data synchronization when the client wins according to the configured conflict policy.

Embodiment 2 is described as follows, which is an embodiment of the present disclosure in the second situation shown in Table 4.

At first, all LUIDs of the data items in the client database are invalidated. And on the server, a mapping between the LUIDs and the GUIDs is invalidated too. In such situation, the client will assign new LUIDs to the data items in the client database. The objective of the smart sync in such situation is to re-establish the GUID-LUID mapping on the server in a fast and efficient way, and synchronize the data items in the client database with corresponding data items in the server database.

Next, as shown in FIG. 9a, the client assigns new LUIDs to the data items in the client database. The corresponding relations stored in the server database are invalidated, so matching data items can only be found based on the data fingerprints, and data items without matching data fingerprints are regarded as new items.

At last, the data fingerprints in the two databases are compared.

Step A: The client detects that the LUIDs of the data items in the client database are out of order and invalidated; in initial stage of the data synchronization, the client sends the server a request for initiating smart sync with a reason value indicating that the LUIDs are out of order and invalidated.

Step B: The server deletes all the LUIDs in the server database, and returns a smart sync confirmation message.

Step C: The client sends the LUID-fingerprints of the data items in the client database to the server, the LUID-fingerprints is as follows: {<11, Fa><12, Fb'><13, Fc><14, Fd'><16, Ff><17, Fh>}.

Step D: Upon receiving the LUID-fingerprints from the client, the server compares the received data fingerprints with the data fingerprints in the server database. And the comparison results include: the data fingerprints of data item 11 and data item 10001 are identical, hence the LUID of the data item 10001 is updated; the data fingerprints of the data items 12-17 match no data fingerprints in the server database.

Step E: The server returns a set of the data items to be synchronized, i.e., a set of data items that have no matching data fingerprints. In this data item set, those regarded as the new items on the client are added into the server database and those regarded as the new items on the server are added into the client database in the data synchronization.

Figure 9B:
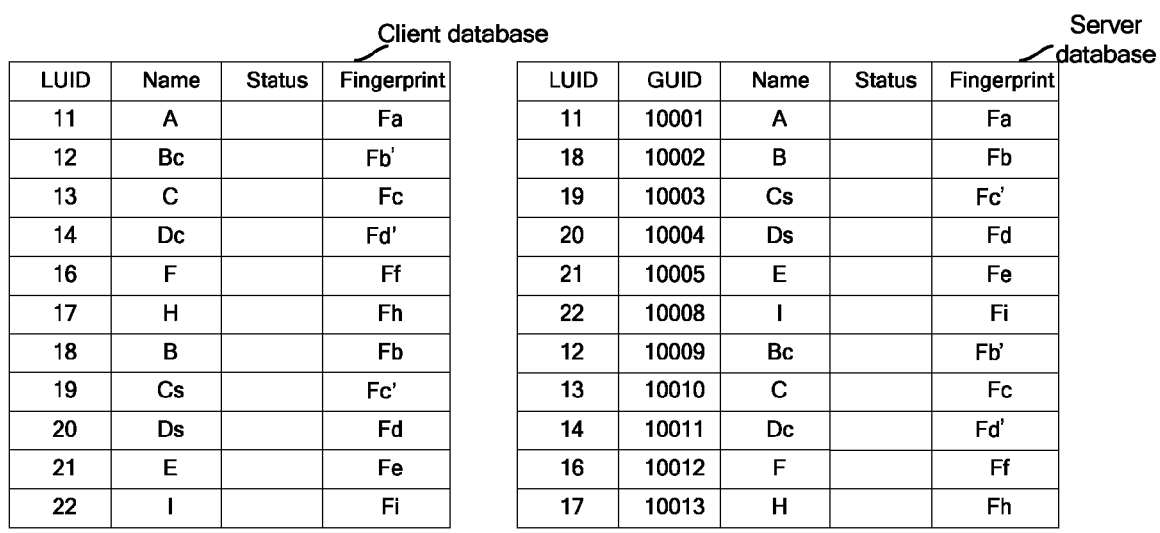
FIG. 9b is a schematic illustrating modification status of the data items in the client database and the server database after the data synchronization in the embodiment of the present disclosure.

Step F: In the completing stage of the data synchronization, the client returns to the server the data fingerprints of the new data items on the server, the server stores the data fingerprints in the server database and returns a storing data fingerprint confirmation message to the client. After the data synchronization, the data items in the client database and server database are shown in FIG. 9b.

In the embodiment described hereafter, a number of data items in the server database are modified and identification bits are inserted into the data fingerprints of the modified data items. And the identification bits are used to indicate that the data fingerprints are modified or invalidated.

Embodiment 3 is described as follows, which is an embodiment of the present disclosure in the first situation shown in Table 4.

At first, the initial states of the data items in the client database and in the server database are shown in FIG. 10a. Then the data items in client database and the server database are modified as shown in FIG. 10b.

Next, the Change Log of the data items in the client database is lost, as shown in FIG. 10c.

At last, the data fingerprints in the two databases are compared.

Step A: The client detects that the Change Log of the data items in the client database is lost. In the initial stage of the data synchronization, the client sends a request for initiating smart sync with a reason value indicating that Change Log is lost.

Step B: The server returns a smart sync confirmation message.

Step C: The client sends the server the LUID-fingerprints of the data items in the client database, the LUID-fingerprints are as follows: {<1,Fa><2,Fb'><3,Fc><4,Fd'><6,Ff><7, Fh>}.

Step D: Upon receiving the LUID-fingerprints from the client, the server performs comparison as follows:
Server database <1, Fa><2, Fb><3, →<4, →<5, Fe>
Client database <1, Fa><2, Fb'><3, Fc><4, Fd'><6, Ff><7, Fh>.

The results of the comparison include: data item 1, no data synchronization needed; data item 2, since Fb' is not identical with Fb, and the data fingerprint of the data item in the server database includes no identification bit, it is determined that the data item in the client database has been modified and data synchronization is needed; data item 3, because the data fingerprint of the data item in the client database is identical with the data fingerprint of the data item in the server database, and the data fingerprint of the data item in the server database includes an identification bit, it is determined that the data item has been modified in the server database and has been unchanged in the client database, no data synchronization is needed on the client; data item 4, because the Fd' is not identical with the Fd, and the data fingerprint of the data item in the server database includes an identification bit, it is determined that the data item has been modified by both the client and the server and a conflict occurs, then whether to implement data synchronization depends on a conflict policy; data item 5, the server detects that no data fingerprint is received from the client for the data item whose LUID is 5, and the server determines that the client has deleted the data item, so the server will delete the data item too and no data synchronization is needed for the data item on the client; data item 6, the server detects that the data fingerprint of the data item whose LUID is 6 has been deleted on the server, so the server will send a deleting command to the client in the data synchronization stage to delete the data item on the client; data item 7, a new data item on the client and data synchronization is needed; data item 8, the server detects no data fingerprint for comparison on the server, and thus determines that the data item is a new data item on the server.

Step E: The server returns to the client a set of the data items to be transmitted to the server, the set is as follows: <2, 3?, 4 ?, 6, 7>.

Step F: The client initiates the data synchronization based on the data item set from the server.

Step G: In the completing stage of the data synchronization, the client returns the data fingerprint of 10008 to the server, the server stores the data fingerprint and returns a storing data fingerprint confirmation message to the client.

Embodiment 4 is described as follows, which is an embodiment of the present disclosure in the second situation shown in Table 4.

At first, all LUIDs of the data items in the client database are invalidated. And on the server, a mapping between the LUIDs and the GUIDs is invalidated. In such situation, the client will assign new LUIDs to the data items in the client database. The objective of the smart sync in such situation is to re-establish the GUID-LUID mapping on the server in a fast and efficient way, and synchronize the data items in the client database with the data items in the server database.

Next, as shown in FIG. 11a, the client assigns new LUIDs to the data items in the client database. The corresponding relations stored in the server database are invalidated, so matching data items can only be found based on the data fingerprints, and data items without matching data fingerprints are regarded as new items.

At last, the data fingerprints in the two databases are compared.

Step A: The client detects that the LUIDs of the data items in the client database are out of order and invalidated. In the initial stage of the data synchronization, the client sends the server a request for initiating smart sync with a reason value indicating that the LUIDs are out of order and invalidated.

Step B: The server deletes all the LUIDs in the server database, and returns a smart sync confirmation message.

Step C: The client sends the LUID-fingerprints of the data items in the client database to the server. The LUID-fingerprints are as follows: {<11, Fa><12, Fb'><13, Fc><14, Fd'><16, Ff><17, Fh>}.

Step D: Upon receiving the LUID-fingerprints from the client, the server compares the received data fingerprints with the data fingerprints in the server database. And results of the comparison include: the data fingerprints of data item 11 and data item 10001 are identical, and the LUID of data item 10001 is updated accordingly, and no data synchronization is needed on the client for the data item; the data fingerprints of data item 13 and data item 10003 are identical, and the data fingerprint in the server database includes an identification bit, hence data item 13 corresponds to data item 10003 and the LUID of data item 10001 is updated accordingly, the data item has been modified on the server, therefore no data synchronization is needed on the client for the data item; no matching data fingerprint is found in the server database for data items 12, 14, 16 and 17.

Step E: The server returns to the client a set of the data items to be transmitted to the server, the set is as follows: <12, 14, 16, 17>.

Step F: The client initiates the data synchronization based on the data item set from the server.

Step G: In the completing stage of the data synchronization, the client returns to the server the data fingerprints of the new data items on the server, and the server stores the data fingerprints in the server database and returns a storing data fingerprint confirmation message to the client.

In the embodiment of the present disclosure, after the one-party computation smart sync is completed. The client may also send the data synchronization status information indicating completion of the data synchronization to the server in the data synchronization completing confirmation message. And before returning a confirmation response to the client, the server stores the data synchronization status information in the server database. Obviously, the data synchronization status information includes the data fingerprints of the synchronized data items in the client database, the data fingerprint of the client database or Anchor information thereof etc, the above mentioned data fingerprints will be verified by the server or client in the next data synchronization.

In the embodiment of the present disclosure, the client may initiate the data synchronization after determining which type of one-party computation smart sync. Different one-party computation smart syncs are identified by synchronization initiation reason codes, and the server determines the data fingerprints verification method in a one-party computation smart sync according to the reason code.

Figure 12:
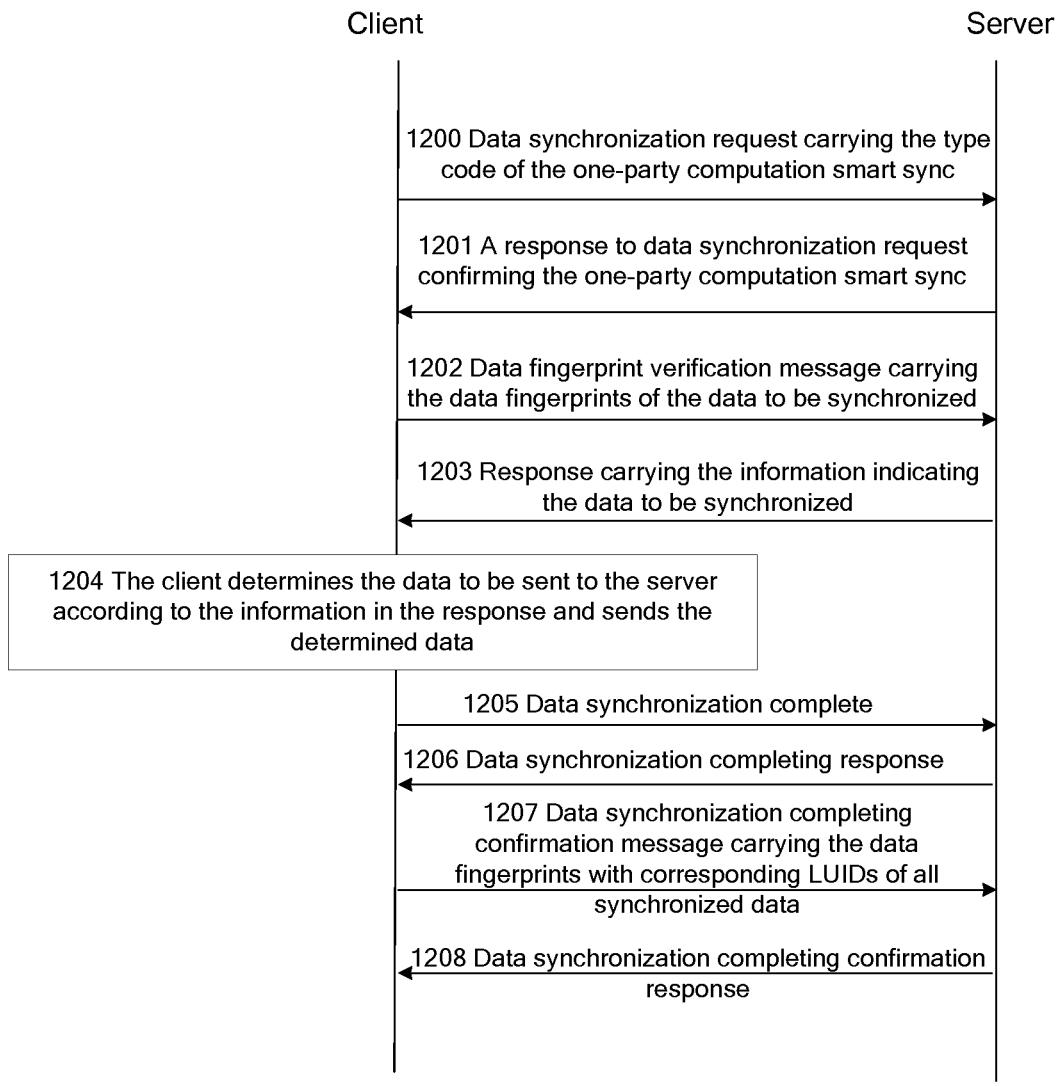
FIG. 12 is a flow chart of the one-party computation smart sync in an embodiment of the present disclosure.

FIG. 12 is a flow chart of the one-party computation smart sync in embodiment of the present disclosure; the flow includes the following processes.

In process 1200, a client initiates a data synchronization request for one-party computation smart sync, and the request carries a type code indicating a specified type of one-party computation smart sync.

The reason for initiating the smart sync by the client can be learned from the request, and possible reasons includes: the data fingerprints generation method being changed in the client database; the LUIDs in the client database being out of order or/and regenerated; and the modification status information of the data in the client database being lost, and so on.

As shown in Table 2, three types of one-party computation smart sync can be employed for the data synchronization. In the first type of one-party computation smart sync, the client is required to send out the data fingerprints of all data items in the client database. And in the second type of one-party computation smart sync, the client is required to send out the data fingerprints of the data items whose modification status have changed in the client database.

In process 1201, upon receiving the request, the server determines to accept the one-party computation smart sync requested by the client, and returns a response message to the client.

In process 1202, the client sends the data fingerprints of the data items to be synchronized in the client database to the server in a data characteristic verification message.

Different data items shall be synchronized in different sync types. in the first type of one-party computation smart sync, all the data items in the client database need to be synchronized; in the second type of one-party computation smart sync, the data items whose modification status have been changed need to be synchronized; and in the third type of one-party computation smart sync, the data items with specified LUIDs in the client database need to be synchronized.

In process 1203, the server verifies the received data fingerprints based on the data fingerprints in the server database, and determines the data items to be synchronized according to result of the verification. The server sends information indicating the data items to be synchronized to the client in a response message.

In different sync types, the verification process may be varied, and the detailed processes have already been given in the fore-going description.

In the embodiment, the information indicating the data items to be synchronized includes the LUIDs, data fingerprints or the status codes.

In process 1204, the client determines the data to be sent to the server according to information in the response message, and sends the determined data to the server.

In process 1205, the server synchronizes the data in the server database based on the data from the client, and returns a data synchronization completing response to the client during or after the synchronization processes in the server database, the data synchronization completing response carries the data which the client should synchronize in the client database.

In process 1206, upon receiving the data synchronization completing response, the client synchronizes the data in the client database based on the data carried in the response.

In process 1207, the client sends the data fingerprints of all synchronized data items with corresponding LUIDs to the server in a data synchronization completing confirmation message.

In process 1208, the server stores the data fingerprints of all synchronized data items in the data synchronization completing confirmation message according to LUIDs, and returns a data synchronization completing confirmation response message to the client.

Two-way computation smart sync is described in the following embodiments.

In order to implement the two-way computation smart sync, the client and the server negotiate the sync type in advance, e.g. at the initial stage or another stage of the data synchronization.

Figure 13:
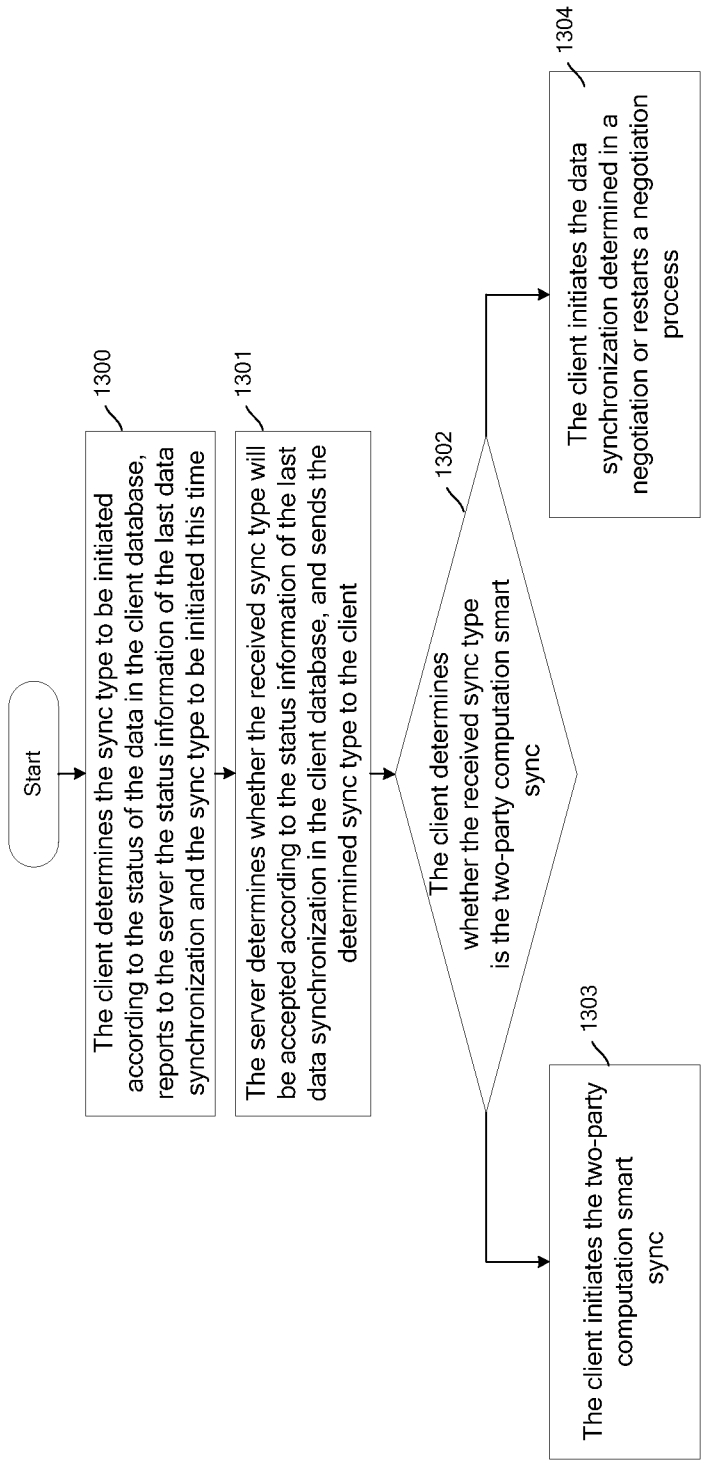
FIG. 13 is a flow chart of negotiating to adopt two-party computation data synchronization in an embodiment of the present disclosure.

FIG. 13 is a flow chart of negotiation in the embodiment of the present disclosure which determines to adopt two-party computation smart sync, and the flow includes the following processes.

In processes in block 1300, a client determines a sync type to be initiated according to status of data items in a client database, and reports to the server status information of the last data synchronization and the sync type to be initiated this time.

In processes in block 1301, the server determines whether the received sync type will be accepted according to the status information of the last data synchronization in the client database, and sends the determined sync type to the client.

In processes in block 1302, the client determines whether the received sync type is the two-party computation smart sync, and if yes, processes in block 1303 are performed; otherwise processes in block 1304 are performed.

In processes in block 1303, the client initiates the two-party computation smart sync.

In processes in block 1304, the client initiates the data synchronization determined in the negotiation, or the client restarts the negotiation.

In embodiments of the present disclosure, the client may choose any sync type and request the client to adopt the chosen sync type. And the client will check the status of the data items in the client database before determining whether to initiate the data synchronization requested by the client, or to initiate a data synchronization that puts the data items in the client database back into order (e.g., a two-party computation smart sync or a slow data synchronization).

The process of checking the status of the data items in the client database by the client further includes: checking whether the LUIDs in the client database are out of order or/and regenerated, and checking whether the modification status information of the data item in the client database is lost.

When the client detects that the LUIDs in the client database are out of order or/and regenerated, or/and the modification status information of the data in the client data base is lost, the client will initiate the two-party computation smart sync.

When the server detects, according to the status information of the last data synchronization, that the last data synchronization failed, or/and a mapping table in the server database is lost, or/and the modification status information of the data item in the server database is lost, the server will determine to initiate the two-way computation smart sync.

The sync types determined by the client and the server are shown in Table 10 and Table 11 respectively.

TABLE 10 sync type initiated by the client in the embodiment

| LUIDs are out of order or/and regenerated | Change Log is lost | Data synchronization type |
|---|---|---|
| Yes | No | Two-party computation smart sync type 3 |
| No | Yes | Two-party computation smart sync type 4 |
| Yes | Yes | Two-party computation smart sync type 3 |

TABLE 11 sync type initiated by the server in the embodiment

| The status information of the last data synchronization indicates data synchronization failure | Mapping table in the server database is lost | Data synchronization type |
|---|---|---|
| Yes | No | Two-party computation smart sync type 4 |
| No | Yes | Two-party computation smart sync type 3 |

In this embodiment, the server may determine whether the last data synchronization failed according to the status information of the last data synchronization in the foregoing two ways. And the foregoing two ways are similar to the corresponding processes in one-way computation smart sync.

Of course, the client and the server in this embodiment may also arrange an agreement in advance to initiate the two-party computation smart sync to synchronize all data, data of all types, data of certain type(s) or data within certain value threshold(s) in the client database and server database.

In embodiments of the present disclosure, the client and the server may determine the sync type according to the types and size of the data item to be synchronized, and the criteria employed in the process of determining include:

1) data item in vCard or vCalendar data type shall be synchronized in the one-party computation smart sync, because data item in vCard or vCalendar data type includes multiple fields, and difference of data field order and field coding method in the client or on the server can influence the generation of the data fingerprint;

2) data item in file or MP3 data type can be synchronized in the two-party computation smart sync, because data item in file or MP3 data type does not involve any variation in the field order or coding method and the data fingerprints can be generated based on the data item directly;

3) whether a data fingerprint verification is needed shall be determined according to the size of the data item to be synchronized.

When filtering processes are used in the data synchronization, only the data item that meets the filtering criteria will enter stages of data fingerprint negotiation and data synchronization.

In the two-party computation smart sync, the client and the server have to make a calculation to generate data fingerprints for the data items in the client database and the server database. And the client and the server have to employ the same data fingerprint algorithm which can be set in the client and the server in advance. In the embodiment of the present disclosure, the client and the server may also negotiate the data fingerprint algorithm.

The process of negotiating the data fingerprint algorithm between the client and the server includes the following steps:

Step 1: A client sends an initial data package carrying one or multiple data fingerprint algorithm identifications to a server.

Step 2: Upon receipt of the initial data package, the server learns data fingerprint algorithms for choosing according to the one or multiple data fingerprint algorithm identifications in the initial data package, and chooses a data fingerprint algorithm based on the status of the server.

Step 3: The server returns the initial data package carrying the identification of the chosen data fingerprint algorithm to the client.

After the negotiation, the client generates data fingerprints of the data items in the client database with the negotiated data fingerprint algorithm, the server also generates data fingerprints of the data items in the server database with the negotiated data fingerprint algorithm.

In practical applications, because the server supports all existing data fingerprint algorithms, the client may simply designate a data fingerprint algorithm that fits the client. The process between the client and the server for designating the data fingerprint algorithm by the client in the embodiment of the present disclosure includes the following steps:

Step 1: A client sends an initial data package carrying an identification of a designated data fingerprint algorithm to the server;

Step 2: The server determines the data fingerprint algorithm according to the identification of the designated data fingerprint algorithm in the initial data package, and returns the initial data package to the client, wherein the returned initial data package includes the identification of the data fingerprint designated by the client and confirmed by the server.

Then the client and the server generate data fingerprints of the data items in their own databases with the data fingerprint algorithm designated by the client.

In the embodiment of the present disclosure, the data fingerprint algorithm may be designated by the client after the initial stage of data synchronization instead of in the initial stage of data synchronization. When the client sends the data fingerprint verification message to the server, the message also carries the identification of the data fingerprint algorithm designated by the client. Upon receipt of the data fingerprint verification message, the server determines the data fingerprint algorithm according to the data fingerprint algorithm identification in the data fingerprint verification message, and generates data fingerprints of the data items in the server database with the determined data fingerprint algorithm, and the follow-up processes are performed.

The data fingerprint verification process of the server in the two-way computation smart sync is basically the same as the data fingerprint verification process in the one-way computation smart sync, except that the data fingerprints in the server database are generated by the server itself with the data fingerprint algorithm instead of obtained from the client. The process will not be described repeatedly in detail herein.

After the two-party computation smart sync, the embodiment further includes the following steps. The client sends data synchronization status information of the synchronized data in the client database to the server in the data synchronization completing confirmation message. The server compares the data synchronization status information of the synchronized data in the client database in the data synchronization completing confirmation message with corresponding data synchronization status information in the server database. The corresponding data synchronization status information in the server database can be sent from the client and stored by the server or generated by the server. If the received data synchronization status information is identical with the data synchronization status information in the server database, the server returns a response message; otherwise, the two-party computation smart sync shall be repeated. Obviously, the data synchronization status information may include Anchor in the client database and the server database, or the data fingerprints of the two databases, or the data fingerprints of the data items in the two databases.

Figure 14:
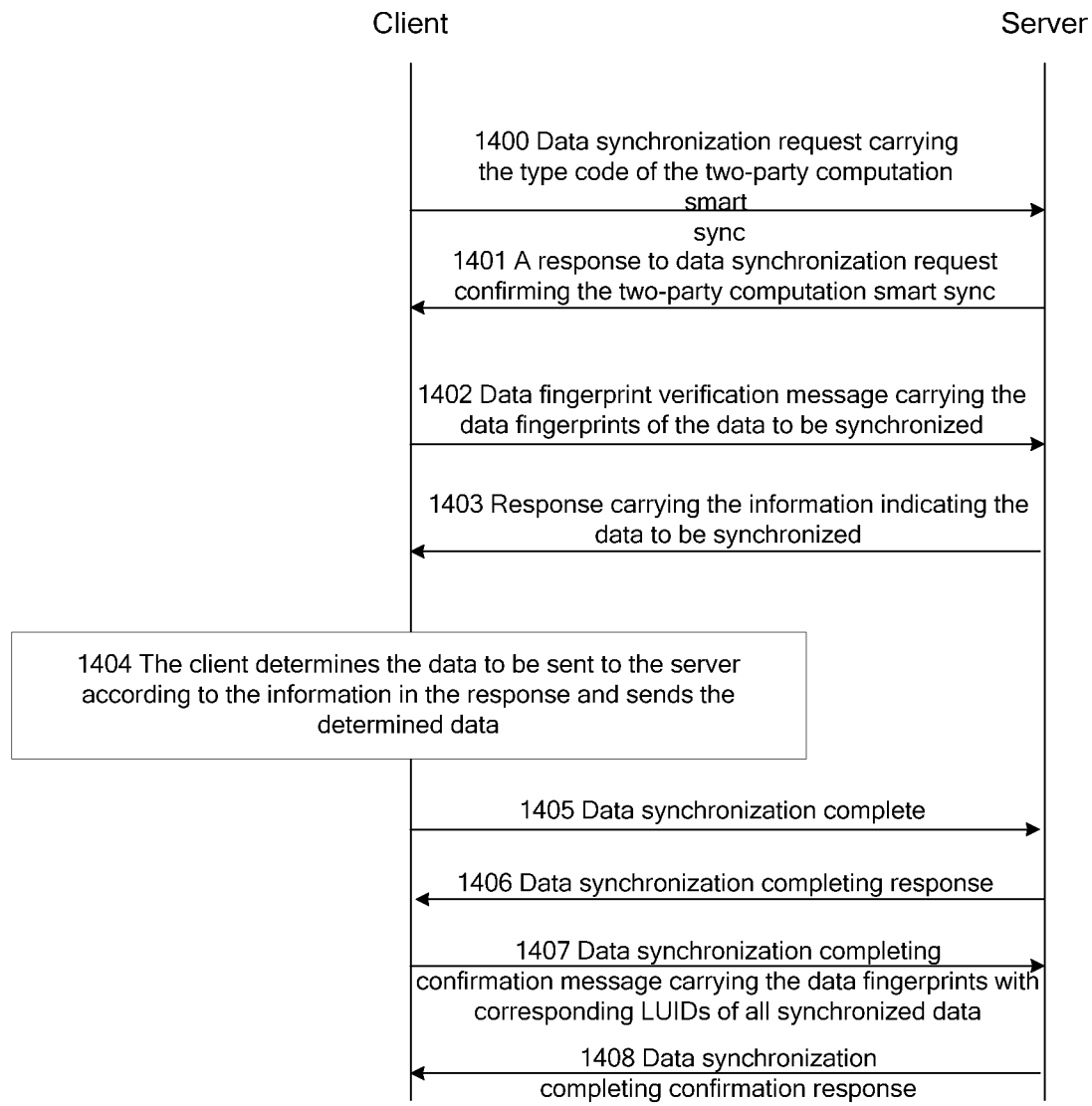
FIG. 14 is a flow chart of the two-party computation smart sync in an embodiment of the present disclosure.

FIG. 14 is a flow chart of the two-party computation smart sync in embodiment of the present disclosure, and the flow includes the following processes.

In process 1400, a client initiates a data synchronization request for a two-party computation smart sync, the data synchronization request carries a type code indicating a specified type of two-party of computation smart sync.

The reason for initiating the smart sync by the client can be learned from the data synchronization request. And possible reasons include: the LUIDs of the data items are out of order or/and regenerated, and the modification status information of the data is lost.

As shown in Table 10, two methods can be employed for the data synchronization, the first method requires the client to send the modification status information or the data fingerprints of unchanged data items in the client database. And the second method requires the client to send the data fingerprints of all data items in the client database with corresponding LUIDs.

In process 1401, upon receipt of the data synchronization request, the server determines to accept the two-party computation smart sync requested by the client, and returns a response message to the client.

In process 1402, the client sends the data fingerprints of the data items to be synchronized in the client database to the server in a data characteristic verification message.

The data items to be synchronized are different in different sync types. In the first sync type shown in Table 11, the data in modification status or unchanged data in the client database shall be synchronized; in the second sync type shown in Table 12, all data items corresponding to the LUIDs shall be synchronized.

In process 1403, the server verifies the received data fingerprints based on the data fingerprints in the server database, and determines the data items to be synchronized according to the results of the verification. The server sends the information indicating the data items to be synchronized to the client in a response message.

In different sync types, the verifying process may be varied, and the detailed process has already been given in the fore-going description.

In the embodiment, the information indicating the data items to be synchronized includes: the LUIDs of the data items to be synchronized, the data fingerprints generated by the client database, or the data items sent by the server to the client.

In process 1404, the client determines the data item to be sent to the server according to the information in the response message, and sends the determined data item to the server.

In process 1405, the server synchronizes the data item in the server database based on the data item from the client, and returns a data synchronization completing response to the client during or after the synchronization process in the server database. The data synchronization completing response carries the data item that should be synchronized in the client.

In process 1406, upon receipt of the data synchronization completing response, the client synchronizes the data item in the client database based on the data item carried in the data synchronization completing response.

In process 1407, the client sends the data fingerprints of all synchronized data items with corresponding LUIDs to the server in a data synchronization completing confirmation message.

In process 1408, in terms of the LUIDs, the server verifies the data fingerprints in the server database based on the received data fingerprints. If the data fingerprints in the server database are identical with the received data fingerprints, the server returns a data synchronization completing confirmation response message to the client; if the data fingerprints in the server database are different from the received data fingerprints, the data synchronization shall be repeated (not shown in the accompanying drawing).

Alternatively, in the processes 1407 and 1408, the server may send the data fingerprints to the client, and the client verifies the data fingerprints.

According to the embodiment of the present disclosure, no matter which of the one-party computation smart sync and the two-party computation smart sync is performed, the server always returns the information indicating the data to be synchronized to the client after the data fingerprint verification. And the information may include the LUIDs of the data items to be synchronized or the data fingerprints of the data items to be synchronized in the client database, or status codes corresponding to the LUIDs or the data fingerprints. An embodiment is given hereafter to further illustrate the method.

Table 12 or Table 13 gives a description of the status codes that may be included in the information sent by the server to the client to indicate the data to be synchronized.

TABLE 12 description list 1 of the status codes in the information sent by the server to the client to indicate the data to be synchronized

| Data fingerprint verification result: | Status code |
| --- | --- |
| No synchronization is needed | 217 |
| The client needs to send data to the server while the server needs not to send data to the client | 218 |
| The client needs not to send data to the server while the server needs to send data to the client | 219 |
| The client needs to send data to the server and the server needs to send data to the client | 220 |
| Conflict detected and resolved, the client wins and the client needs to send data to the server | 221 |
| Conflict detected and resolved, the server wins and the server needs to send data to the client | 222 |

TABLE 13 description list 2 of the status codes in the information sent by the server to the client to indicate the data to be synchronized

| Data fingerprint verification result: | Status code |
| --- | --- |
| No synchronization is needed | 217 |
| Only the client needs to send data to the server | 218 |
| Only the server needs to send data to the client | 219 |
| The client needs to send data to the server while the server needs to send data to the client | 220 |

The possible result of the data fingerprint verification on the server is shown in Table 14.

TABLE 14 result of the data fingerprint verification on the server in the embodiment

| LUID | Fingerprint | Verification Result | Status code |
| --- | --- | --- | --- |
| 1111 | F1 | No synchronization is needed | 217 |
| 1112 | F2 | No synchronization is needed | 217 |
| 1113 | F3 | The client doesn't need to send data to the server while the server needs to send data to the client | 219 |
| 1114 | F4 | Conflict detected and resolved, the server wins and the server needs to send data to the client | 222 |
| 1115 | F5 | Conflict detected and resolved, the client wins and the client needs to send data to the server | 221 |
| 1116 | F6 | Conflict detected and resolved, the server wins and the server needs to send data to the client | 222 |
| 1117 | F7 | Conflict detected and resolved, the client wins and the client needs to send data to the server | 221 |
| 1118 | F8 | The client needs to send data to the server while the server does not need to send data to the client | 218 |
| 1119 | F9 | The client needs to send data to the server while the server does not need to send data to the client | 218 |
| 1120 | F10 | The client does not need to send data to the server while the server needs to send data to the client | 219 |
| 1121 | F11 | The client does not need to send data to the server while the server needs to send data to the client | 219 |

Three methods may be employed by the server for returning the information indicating the data to be synchronized to the client.

According to the first method, the server returns a list of LUIDs or/and data fingerprints of the data items that should be sent by the client to the server; the LUIDs of the data items that should be sent by the client to the server in this embodiment are given as follows:

<LUID list of the to-be-synchronized data items>1115, 1117, 1118, 119</LUID list of the to-be-synchronized data items>.

According to the second method, the server returns a data fingerprint verification result for each data fingerprint from the client; the LUIDs and the data fingerprint verification results returned by the server in this embodiment are given as follows:

<verification result>
<1111, 217>, <1112, 217>, <1113, 219>, <1114, 222><1115, 221>, <1116, 222><1117, 221>, <1118, 218>, <1119, 218>, <1120, 219>, <1121, 219>
</verification result>.

According to the third method, the server returns a data fingerprint verification result for each data fingerprint from the client. And the data fingerprints with the same verification result are returned in the form of a LUID or/and data fingerprint set. The LUID and data fingerprints returned by the server in this embodiment are given as follows:

<verification result>
<Status>217</Status><LocURI>1111, 1112</LocURI>
<Status>222</Status><LocURI>1114, 1116</LocURI>
<Status>221</Status><LocURI>1115, 1117</LocURI>
<Status>218</Status><LocURI>1118, 1119</LocURI>
<Status>219</Status><LocURI>1113, 1120, 1121</LocURI>
</verification result>.

According to the embodiment of the present disclosure, no matter which of the one-party computation smart sync and the two-party computation smart sync is performed, the following two methods can be employed for verifying the data fingerprints generated by the client and the server for the data items in the client database and the server database. In the first method, the data fingerprints are verified based on data level. When the data fingerprints in the client database are different from the data fingerprints in the server database, the client and the server verify the data fingerprints of the data items in the two databases based on the data levels. That is, the data fingerprint of the data item with high data level are verified at first, and whether the data fingerprint of the data with low data level shall be verified is determined according to a verification result of the data fingerprints of data item with high data level. In the second method, the data fingerprints are verified regardless of the data levels. When it has been determined that the data items in the client database are different from the data items in the server database, the client will send the data fingerprints of all data items in the client database to the server, and the server will verify each of data fingerprints of the data items in the server database based on the received data fingerprint. The two methods are described in detail hereafter.

The first method: data level-based data fingerprint verification.

Figure 15:
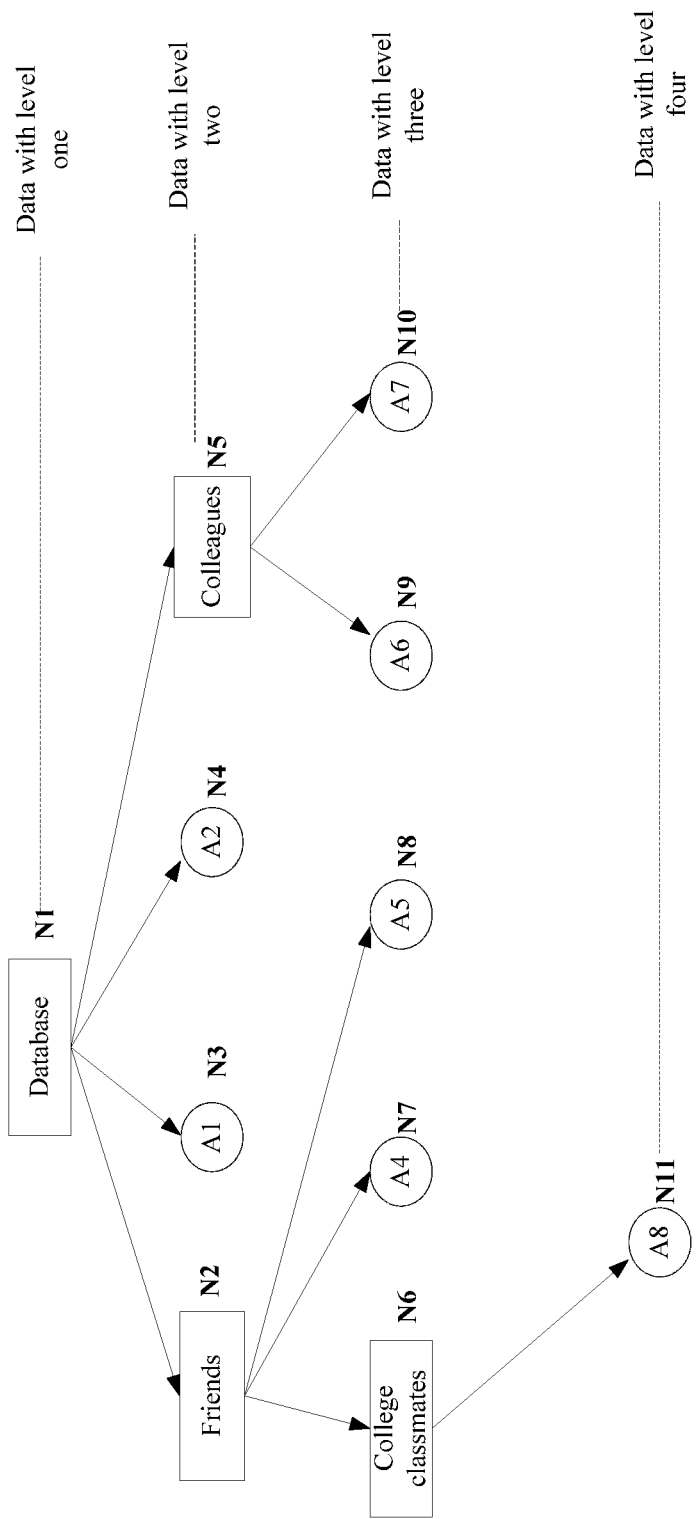
FIG. 15 is a schematic illustrating how to store data in the client database on different levels in an embodiment of the present disclosure.

In order to implement the verification to data fingerprint based on data levels, data items should be stored on different data levels in the client database and the server database. FIG. 15 shows the data items on different data levels in the client database in the embodiment of the present disclosure. The data items in the client database are stored on four data levels and each data item is identified with a data fingerprint, that is, the values of the data fingerprints range from N1 to N11. Table 15 shows a data storage table.

TABLE 15 data storage table with corresponding data

| LUID | Name | Property | Data Fingerprint |
|------|------|----------|------------------|
| 1110 | Friends |  | N2 |
| 1111 | A1 |  | N3 |
| 1112 | A2 |  | N4 |
| 1113 | Colleagues |  | N5 |
| 1114 | College Classmates |  | N6 |
| 1115 | A4 |  | N7 |
| 1116 | A5 |  | N8 |
| 1117 | A6 |  | N9 |
| 1118 | A7 |  | N10 |
| 1119 | A8 |  | N11 |

In the embodiment of the present disclosure, in order to identify the data levels of the data items in the database, a parental element byte is set up in a data item to indicate a parental element. The parental element indicates the name or LUID of a parental data item. The parental element of the data item with level one is set as a root of the database. The data levels can thus be determined based on the parental element bytes in the data items.

The server database stores the data items on different data levels in the same way. In embodiments of the present disclosure, it is supposed that the LUIDs of the data items in the client database are not out of order/regenerated.

Figure 16:
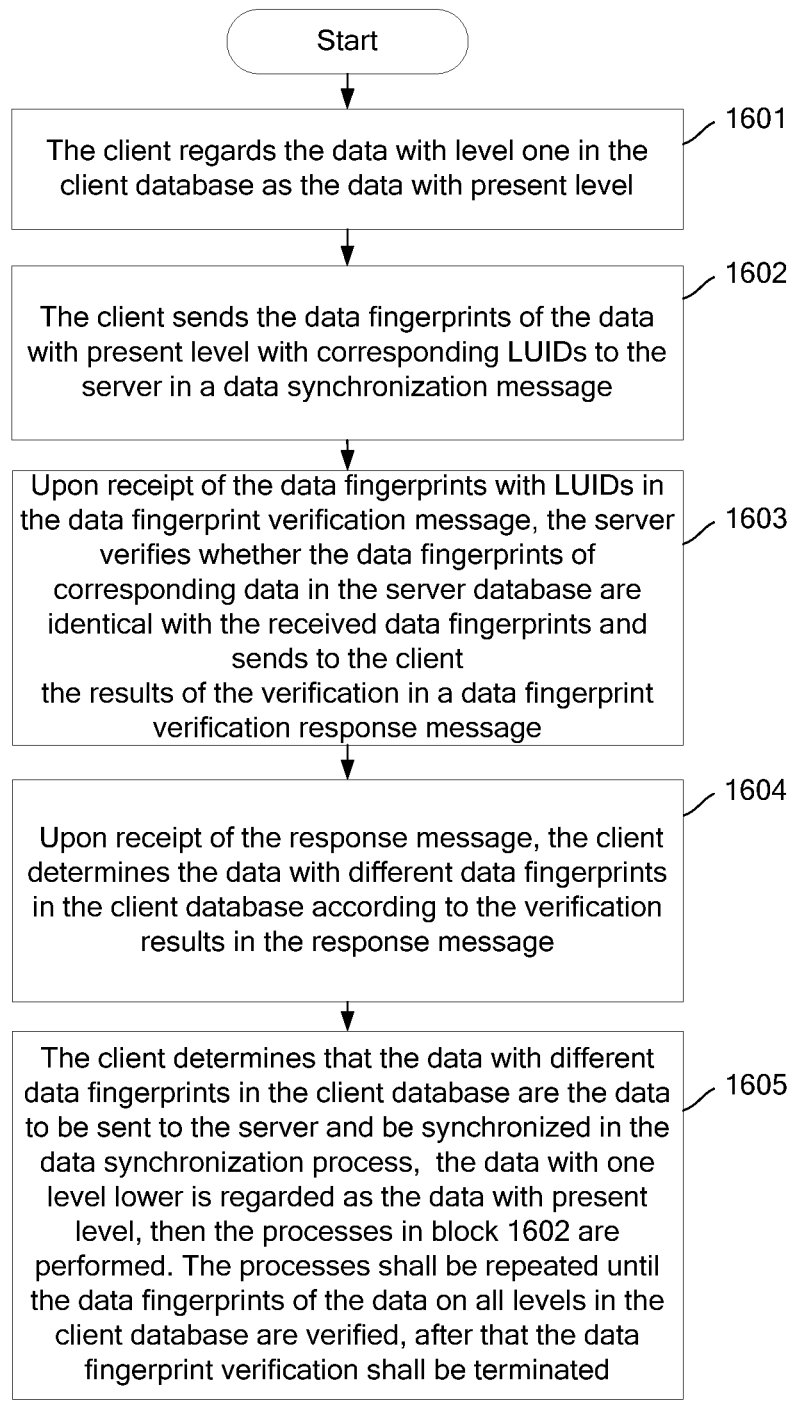
FIG. 16 is a flow chart of verifying, by the client and the server, the data fingerprint with level in an embodiment of the present disclosure.

FIG. 16 is a flow chart of the data level-based data fingerprint verification between the client and the server in embodiment of the present disclosure; the flow chart includes the following processes.

According to processes in block 1601, a client regards the data with level one in the client data base as the data with present level.

In the embodiment, the data with level one may include a virtual data fingerprint of the client database, i.e., the data fingerprint of a root directory in the client database. The data with level two may include the data fingerprints with level one which is lower than the virtual data fingerprint of the client database, such as the data fingerprints of the directories or data items directly under the root directory of the client database.

In this embodiment, the virtual data fingerprint of the present disclosure can be verified in an initial stage of the data synchronization process instead of in the flow illustrated in FIG. 16.

According to processes in block 1602, the client sends the data fingerprints of the data with present level and corresponding LUIDs to the server in a data fingerprint verification message.

According to processes in block 1603, upon receipt of the data fingerprints in the data fingerprint verification message, the server verifies whether the data fingerprints of corresponding data in the server database are identical with the received data fingerprints, and sends results of the verification to the client in a data fingerprint verification response message.

According to processes in block 1604, upon receipt of the data fingerprint verification response message, the client determines the data with different data fingerprints in the client database according to the verification results in the data fingerprint verification response message.

According to processes in block 1605, the client determines that the data with different data fingerprints in the client database are the data to be sent to the server and to be synchronized in the data synchronization process, and the data with one level lower is regarded as the data with present level, then the processes in block 1602 are performed. The processes shall be repeated until the data fingerprints of the data on all levels in the client database are verified, after that the data fingerprint verification shall be terminated.

In FIG. 16, when the verification results in processes in block 1604 include no information of the data fingerprints that fail the verification, the client determines that the data of corresponding data fingerprints in the client database and the data with levels lower than the present level are obsolete data, and no data synchronization is needed. The data fingerprint verification process and the follow-up data synchronization process are thus terminated.

In data level-based data fingerprint verification, three types of data are allowed on each level in the data fingerprint generation process on the client and on the server: files, data items and directories. And each directory may further include files, data items and directories. The data fingerprints can be generated in a recursive manner, e.g., the data fingerprint of the directory is generated with a preset data fingerprint algorithm and with the data fingerprints and LUIDs of the data under the directory as the inputted elements of the algorithm. In addition, the inputted elements used for generating the data fingerprint of the directory are arranged according to the LUID order in the embodiment, so as to ensure that the server and the client will generate identical data fingerprints for the directory.

Therefore, when it is determined that the data with present level is obsolete data in the client database and in the server database, the data of lower levels under the data with present level is also obsolete data.

In the recursive data fingerprint generation process of the data on different levels in the client database and the server database, the client database and the server database can also be regarded as the data with the highest level and be given data fingerprints.

The second method: data level independent data fingerprint verification.

In this embodiment of the present disclosure, it is supposed that the LUIDs of the data in the client database are not out of order/regenerated.

Figure 17:
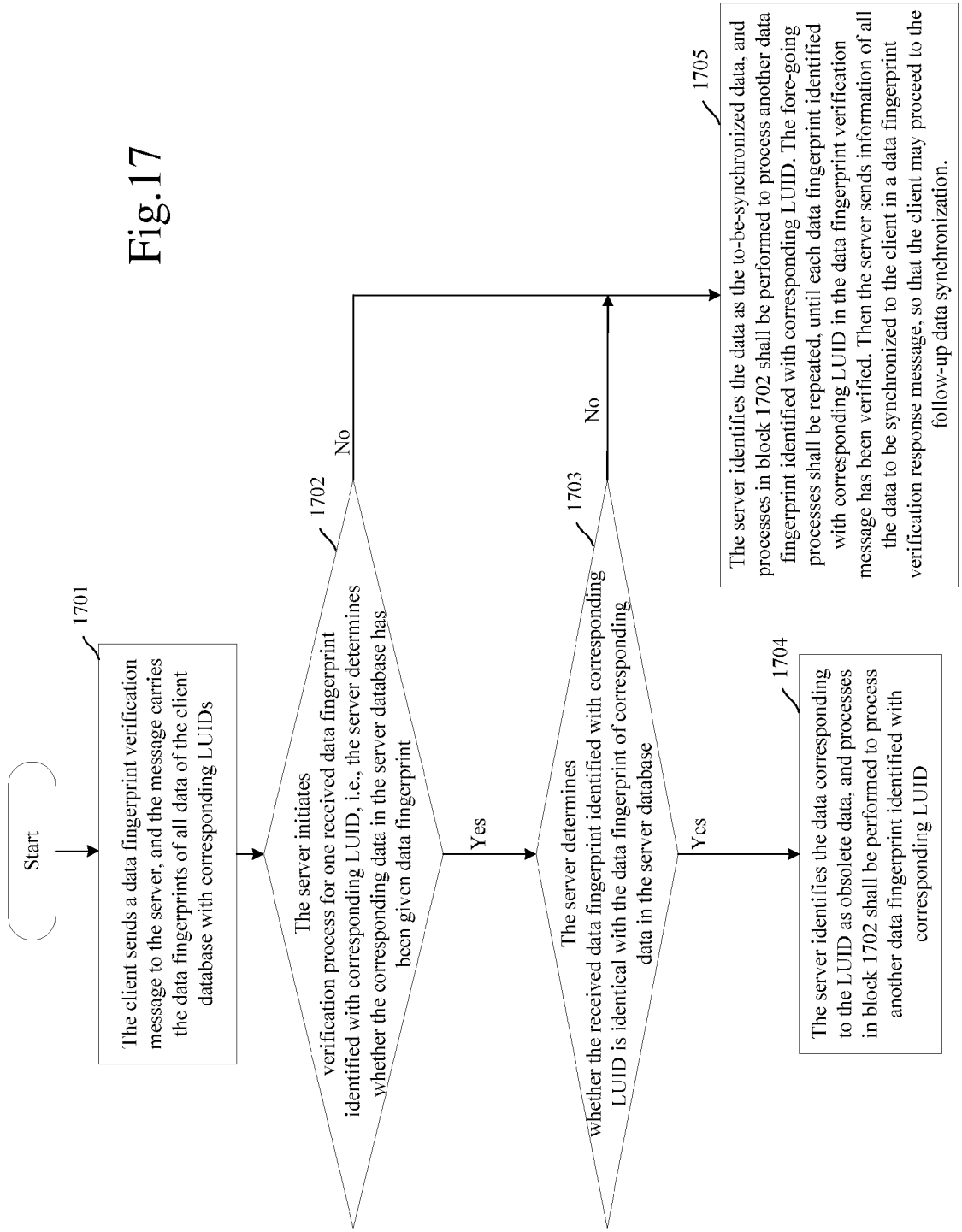
FIG. 17 is a flow chart of verifying, by the client and the server, the data fingerprint without level in an embodiment of the present disclosure.

FIG. 17 is a flow chart of the data fingerprint verification between the client and the server independent of the data levels in the embodiment of the present disclosure. The flow includes the following steps.

According to processes in block 1701, a client sends a data fingerprint verification message to a server, and the data fingerprint verification message carries the data fingerprints of all data of the client database with corresponding LUIDs.

According to processes in block 1702, the server initiates a verification for one received data fingerprint identified with corresponding LUID, i.e., the server determines whether the corresponding data in the server database has been given data fingerprint, and if the corresponding data in the server database has data fingerprints, processes in block 1703 shall be performed, otherwise processes in block 1705 shall be performed.

According to processes in block 1703, the server determines whether the received data fingerprint identified with corresponding LUID is identical with the data fingerprint of corresponding data in the server database, and if yes, processes in block 1704 shall be performed; otherwise processes in block 1705 shall be performed.

According to processes in block 1704, the server identifies the data corresponding to the LUID as obsolete data, and processes in block 1702 shall be performed to process another data fingerprint identified with corresponding LUID.

According to processes in block 1705, the server identifies the data as the to-be-synchronized data, and processes in block 1702 shall be performed to process another data fingerprint identified with corresponding LUID. The fore-going processes shall be repeated, until each data fingerprint identified with corresponding LUID in the data fingerprint verification message has been verified. Then the server sends information of all the data to be synchronized to the client in a data fingerprint verification response message, so that the client may proceed to the follow-up data synchronization.

Embodiments are given hereafter to illustrate how the data fingerprint is generated and how the data synchronization is performed based on the data fingerprint.

An embodiment illustrating how to generate data fingerprints for a database and directories in the database is described as follows.

Figure 18:
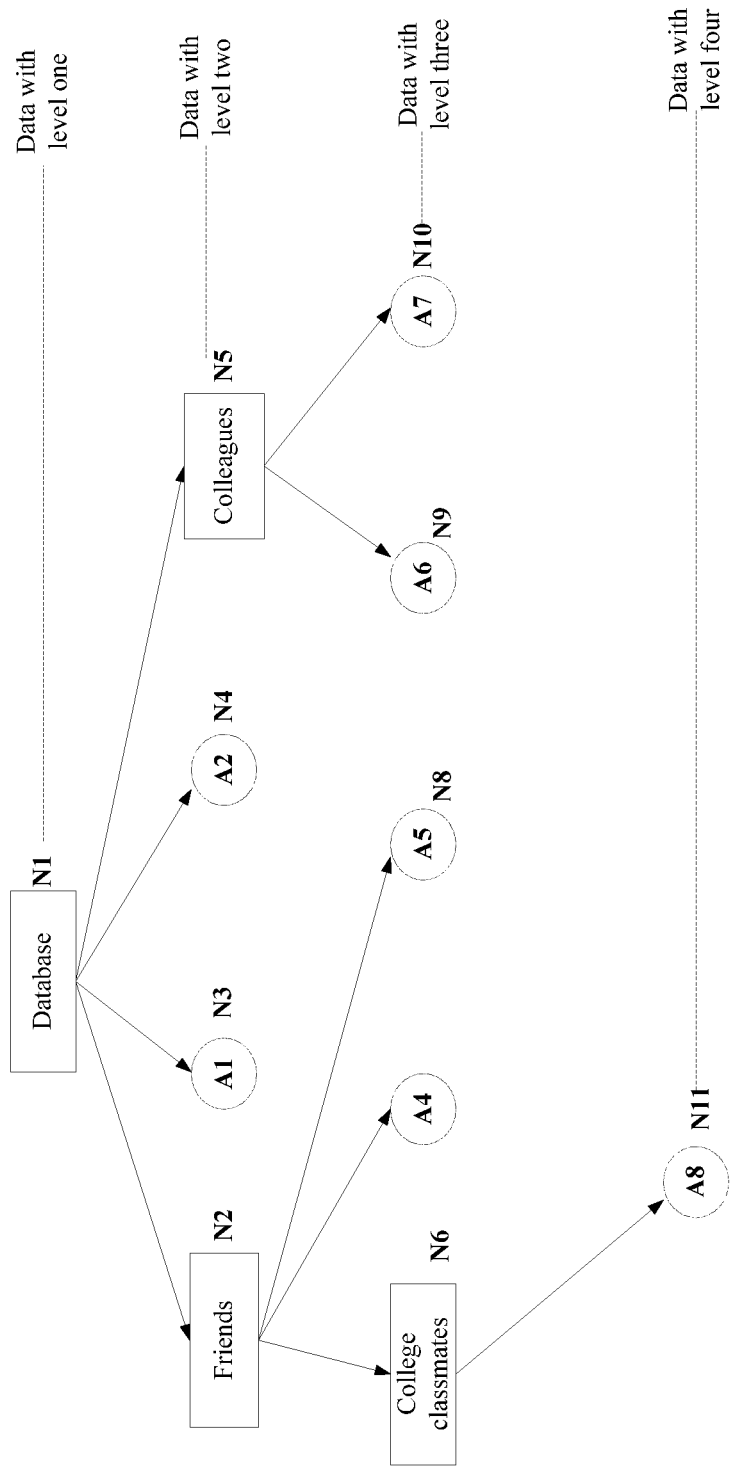
FIG. 18 is a schematic illustrating data structure of data stored in the client database in accordance with an embodiment of the present disclosure.

The data fingerprint of a directory is generated with a preset data fingerprint algorithm, while the data fingerprints of directories, files and data items under the directory and the corresponding LUIDs are taken as the inputted elements of the preset data fingerprint algorithm. As shown in FIG. 18, a directory "Friends" includes three data items: "college classmates", A4 and A5, and the "college classmates" is a directory and the A4 and A5 are data items. When a CRC algorithm is employed, the data fingerprint of the directory "Friends" is generated according to the following equation:

N2 (data fingerprint of "Friends")=CRC ("College classmates: N6; A4: N7; A5: N8").

Similarly, the data fingerprint of the database is generated according to the following equation:

N1 (data fingerprint of database)=CRC ("Friends: N2; A1: N3; A2: N4; "Colleagues: N5").

When a timestamp algorithm is employed as the data fingerprint algorithm, the data fingerprint of the database or the directory includes the latest time of modifications to all lower level data in the database or the directory.

An embodiment illustrating how to generate data fingerprint for a data item is described as follows.

The data fingerprint of a data item is generated with a preset data fingerprint algorithm, while contents of the data item are taken as the inputted element. As shown in Table 18, the data fingerprint of data item A1 is generated according to the following equation:

Data fingerprint N3=CRC (Contents of A1).

An embodiment illustrating how to implement data synchronization based on data fingerprint is described as follows.

Figure 19:
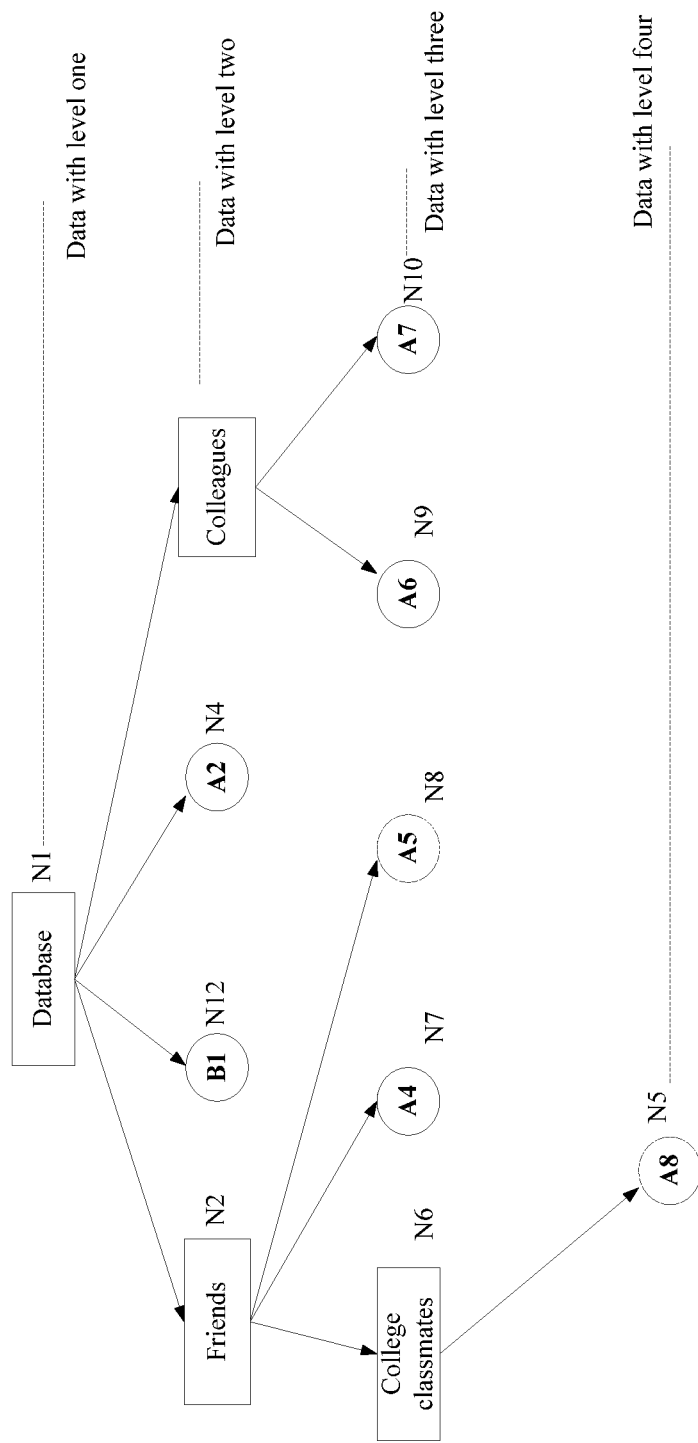
FIG. 19 is a schematic illustrating structure of the data stored in the server database in accordance with an embodiment of the present disclosure.

The data stored in the client database is shown in FIG. 19, in which data item A1 with level two is a new data item, and data item A5 with level three and data item A8 with level four have been modified. The data fingerprint N1 of the client database is supposed to be 000111 in the embodiment, and the data with LUIDs, the data fingerprints of the data and properties of the data in the client database are shown in Table 16.

TABLE 16 the data fingerprints and properties of the data in FIG. 19

| LUID | Name | Property | Data Fingerprint |
| --- | --- | --- | --- |
| 1110 | Friends | Modified | N2 = 111001 |
| 1111 | A1 | New | N3 = 100110 |
| 1112 | A2 | Unchanged | N4 = 101111 |
| 1113 | Colleagues | Unchanged | N5 = 000011 |
| 1114 | College Classmates | Modified | N6 = 010101 |
| 1115 | A4 | Unchanged | N7 = 010001 |
| 1116 | A5 | Modified | N8 = 100001 |
| 1117 | A6 | Unchanged | N9 = 010101 |
| 1118 | A7 | Unchanged | N10 = 0110101 |
| 1119 | A8 | Modified | N11 = 1000000 |

The data stored in the server database is shown in FIG. 19, in which data item B1 with level two is a new data item, and data item A5 with level three and data item A8 with level four have been modified. The data fingerprint N1 of the server database is supposed to be 001111 in this embodiment, and the data with LUIDs, the data fingerprints of the data and the properties of the data in the server database are shown in Table 17.

TABLE 17 the data fingerprints and properties of the data in FIG. 19

| GUID | Name | Property | Data Fingerprint |
| --- | --- | --- | --- |
| 111110 | Friends | Modified | N2 = 111000 |
| 111111 | A2 | Unchanged | N3 = 100110 |
| 111112 | A3 | Unchanged | N4 = 101111 |
| 111113 | Colleagues | Unchanged | N5 = 000011 |
| 111114 | College Classmates | Modified | N6 = 010101 |
| 111115 | A4 | Unchanged | N7 = 010001 |
| 111116 | A5 | Modified | N8 = 100011 |
| 111117 | A6 | Unchanged | N9 = 010101 |
| 111118 | A7 | Unchanged | N10 = 0110101 |
| 111119 | A8 | Modified | N11 = 1000000 |
| 1111001 | B1 | New | N12 = 111001 |

Both the client and the server have modified data item A8 in the client database and in the server database respectively, and the client and the server have made the same modification to the data item A8, therefore the data fingerprint generated by the client for data item A8 is identical with the data fingerprint generated by the server for data item A8.

The client and the server determine to initiate smart sync after a negotiation, and the smart sync adopts a data level-based data fingerprint verification.

Figure 20:
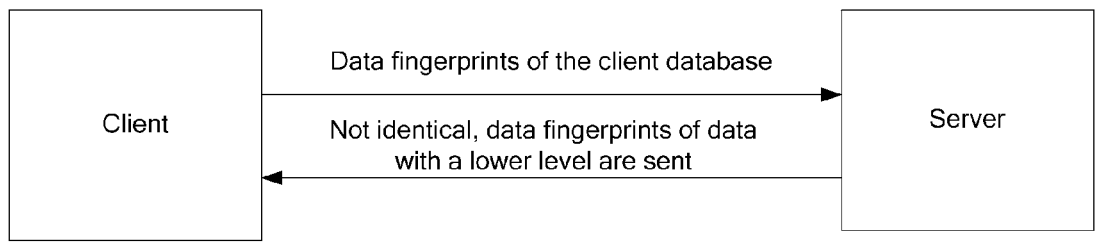
FIG. 20 is a schematic illustrating the process of verifying data fingerprint in database in an embodiment of the present disclosure.

At first, as shown in FIG. 20, a client sends a data fingerprint of the client database to a server. The server compares the received data fingerprint with the data fingerprint of the server database, and determines that the two data fingerprints are not identical with each other. Hence the processes in FIG. 21 are performed.

Figure 21:
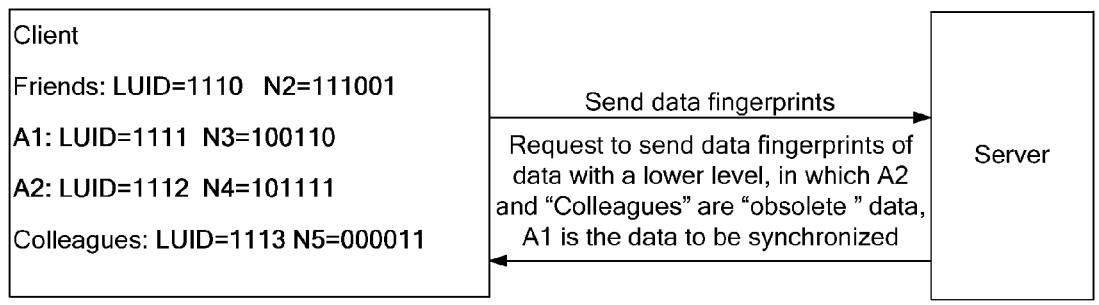
FIG. 21 is a schematic illustrating the process of verifying data fingerprint for second level data in an embodiment of the present disclosure.

Next, as shown in FIG. 21, the client sends the data fingerprints of the data with level two to the server. The server compares the received data fingerprints with the data fingerprints of corresponding data in the server database, and returns results of the comparison to the client.

Figure 22:
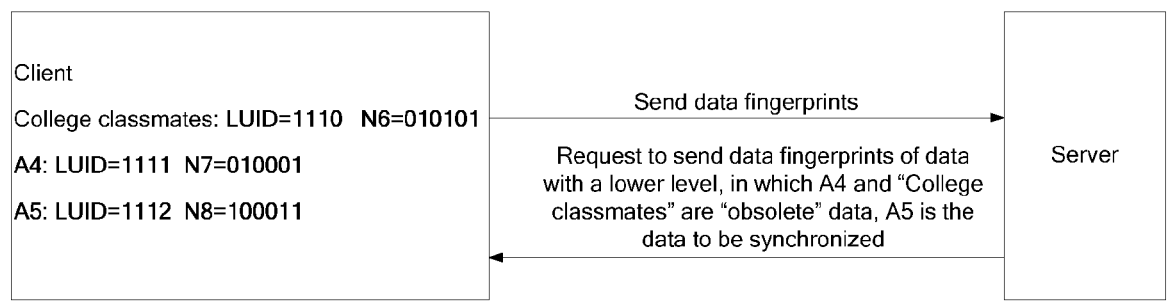
FIG. 22 is a schematic illustrating the process of verifying data fingerprint for data below the second level in an embodiment of the present disclosure.

Then, as shown in FIG. 22, the client sends the data fingerprints of the data under the level two to the server according to the received comparison results. The server compares the received data fingerprints with the data fingerprints of corresponding data in the server database, and returns the results of the comparison to the client.

Finally, the client receives the comparison results and verification of the data fingerprints of the data in the client database is completed. In the data fingerprint verification, it is determined that the data fingerprints of data items A1, A5 and B1 are different from the data fingerprints of corresponding data in the server database, hence the data items A1, A5 and B1 shall be synchronized. The client database includes no data corresponding to the data item B1, and the server determines that the data item B1 is a new data item on the server, and the data item B1 should be sent to the client in the data synchronization process.

Figure 23:
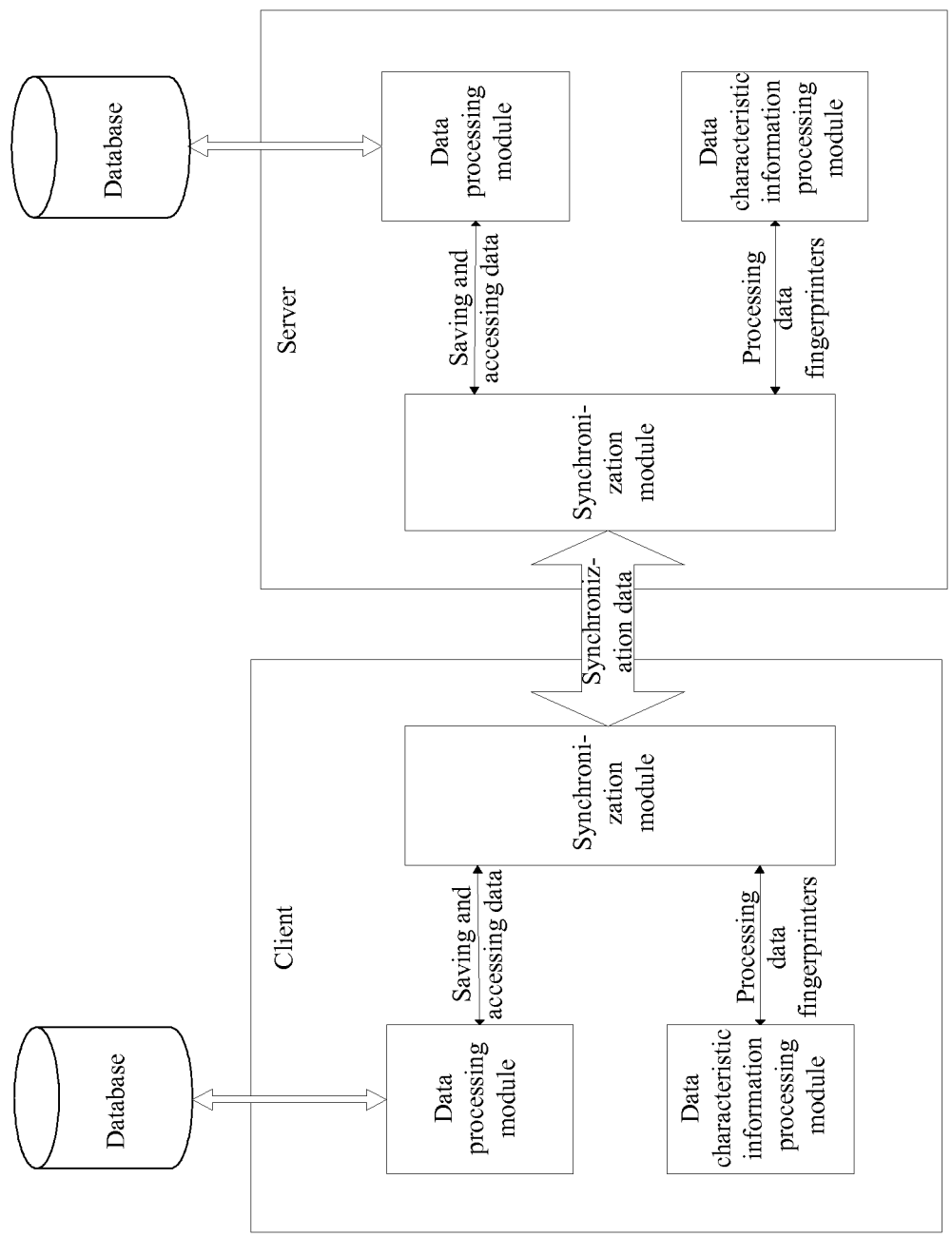
FIG. 23 is a schematic illustrating data synchronization system in an embodiment of the present disclosure.

As shown in FIG. 23, the embodiment of present disclosure further provides a system including a client and a server performing data synchronization with the client. Each of the client and the server is connected to a database used for storing the data in the synchronization.

Each of the client and the server further includes a data processing module, a data fingerprint processing module and a synchronization module.

The data processing module is connected to the database and the synchronization module and is configured to send the data in the database to the synchronization module, or receive a data synchronization message from the synchronization module and modify or add data in the database based on the synchronization data in the data synchronization message.

The data fingerprints processing module is connected to the synchronization module, and is configured to generate data fingerprints for the data in the synchronization module and send the generated data fingerprints to the synchronization, so that the data fingerprints are stored with corresponding data.

The synchronization module is connected to the data processing module, the data fingerprint processing module and the synchronization module of the opposite party in the data synchronization. And the synchronization module is configured to compare the data fingerprints from the synchronization module of the opposite party with the data fingerprints stored in the synchronization module itself, generate comparison results, send the comparison results to the synchronization module of the opposite party, receive the data synchronization message carrying the synchronization data from the synchronization module of the opposite party, and send the data synchronization to the data processing module. Alternatively, the synchronization module is configured to send the data fingerprints stored in the synchronization module to the synchronization module of the opposite party, receive the comparison results from the synchronization module of the opposite party, and send a data synchronization message carrying the synchronization data to the synchronization module of the opposite party according to the received comparison result so that the opposite party can proceed to data synchronization stage.

The synchronization data in the data synchronization message from the synchronization module of the opposite party in the synchronization includes the to-be-synchronized data in the database, and the to-be-synchronized data in the database is determined according to the comparison results from the synchronization module.

The embodiment of present disclosure also provides a client used for data synchronization, as shown in FIG. 23. In FIG. 23, the client includes a synchronization module, a data processing module connected to the synchronization module and a client database, and a data characteristic information processing module connected to the synchronization module.

The data processing module is configured to send the data in the database to the synchronization module, or receive a data synchronization message from the synchronization module, and modify or add data in the database based on the synchronization data in the data synchronization message.

The data characteristic information processing module is configured to set up data characteristics for the data in the synchronization module, and send the data characteristics to the synchronization module.

The synchronization module is configured to compare the data characteristics of the data sent from the server with the data characteristics set up by the data characteristic information processing module for corresponding data, send the result of the comparison to the server, receive the data synchronization message carrying the synchronization data from the server, and forward the data synchronization message to the data processing module. Or the synchronization module is configured to send the data characteristic set up by the data characteristic information processing module to the server, receive a comparison result from the server, and send data synchronization message carrying synchronization data to the server according to the comparison result so that the server can synchronize the data on the server.

In the client, the synchronization module also interacts with the synchronization module of the server to exchange information.

The embodiment of present disclosure also provides a server used for data synchronization, as shown in FIG. 23. In FIG. 23, the server includes a synchronization module, a data processing module connected to the synchronization module and a server database, and a data characteristic information processing module connected to the synchronization module.

The data processing module is configured to send the data in the database to the synchronization module, or receive a data synchronization message from the synchronization module, and modify or add data in the database based on the synchronization data in the data synchronization message.

The data characteristic information processing module is configured to set up data characteristics for the data in the synchronization module and send the data characteristics to the synchronization module.

The synchronization module is configured to compare the data characteristics of the data sent from the client with the data characteristics set up by the data characteristic information processing module for corresponding data, send the result of the comparison to the client, receive the data synchronization message carrying the synchronization data from the client, and forward the data synchronization message to the data processing module. Or the synchronization module is configured to send the data characteristic set up by the data characteristic information processing module to the client, receive a comparison result from the client, and send data synchronization message carrying synchronization data to the client according to the comparison result so that the client can synchronize the data on the client.

In the server, the synchronization module also interacts with the synchronization module of a client to exchange information.

In embodiments of the present disclosure, the client and the server are peers of each other. A client of advanced functions, e.g., a Personal Digital Assistant (PDA) or a personal computer, may adopt a structure and transaction procedures of the server in the equipment information negotiation process. While a server of moderate functions may adopt the structure and transaction procedures of the client in the equipment information negotiation process, e.g., the server may abandon cache mechanism, adopt compression technique, etc.

The system, method and apparatus provided by the embodiments of the present disclosure, while reducing the data to be transmitted and improving the data synchronization efficiency, are easy to be extended, and customized to meet the demands of the user who uses the client.

The purpose, technical solution and merits of the present disclosure have been described in detail with the embodiments. It should be appreciated that the foregoing is only embodiments of this invention and is not for use in limiting the invention. Any modification, equivalent substitution and improvement within the spirit and principles of the invention should be covered in the protection scope of the invention.

What is claimed is:

1. In a server configured to synchronize data with a client database, a data synchronization method thereof, comprising:
    receiving, from a client, a data characteristic verification message that includes a plurality of Local Unique Identifiers (LUIDs) with corresponding data fingerprints that each represent portions of data in the client database for synchronization with a server database, wherein each of the corresponding data fingerprints uniquely identify contents of the portions of data in that different data has different data fingerprints and identical data has identical data fingerprints;
    based on the plurality of LUIDs, comparing one or more of the corresponding data fingerprints included within the data characteristic verification message with one or more data fingerprints stored on the server database;
    based on the comparison, determining at least one of the portions of data on the client database that needs to be synchronized with the server database; and
    based on the determination, sending the client a data characteristic verification response that includes at least one of the plurality of LUIDs corresponding to the at least one of the portions of data on the client database that needs to be synchronized, which indicates to the client what data to synchronize with the server database.

2. The method according to claim 1, further comprising:
    receiving the data fingerprints for the data in the server database from the client, and storing the received data fingerprints in the server, wherein the data fingerprints for the data is obtained, by the client, through computation based on a predetermined data fingerprint algorithm.

3. The method according to claim 2, wherein the receiving, by the server, the data fingerprints for the data in the server database from the client, and storing the received data fingerprints in the server comprise one of the following processes:
    if the client and the server negotiate to employ a one-party computation smart sync, receiving, by the server, the data fingerprints sent from the client in advance, and storing the received data fingerprints, or keeping, by the server, the data fingerprints sent from the client in the last data synchronization in one-party computation smart sync; otherwise, generating, by the server, the data fingerprints through the computation based on the data fingerprint algorithm determined in advance or determined by the client and the server in the negotiation; and
    arranging, by the client and the server in advance, an agreement on employing one-party computation smart sync, wherein the agreement covers all data, data of all types in the client database and the server database, data of specified types, or data of specified size in the client database and server database.

4. The method according to claim 2, further comprising:
    receiving status information of the last data synchronization and a sync type to be initiated this time from the client, wherein the sync type is determined according to the status information of the data in the client database;
    determining, by the server, whether the received sync type is adopted according to the received status information of the last data synchronization in the client database, and sending the determined sync type to the client; and
    receiving the data characteristic verification message carrying one or multiple data fingerprints for data in the client database from the client when the client determines that the received sync type is the one-party computation smart sync.

5. The method according to claim 4, wherein the determining by the server whether the received sync type is accepted according to the received status information of the last data synchronization in the client database further comprises:
    determining to employ the one-party computation smart sync, when the server detects that the last data synchronization failed according to the status information of the last data synchronization and the mapping table and the data fingerprints in the server database are not lost;
    determining to employ the one-party computation smart sync, when the server detects that the mapping table in the server database is lost, or the modification status information in the server database is lost, and the data fingerprints in the server database are not lost.

6. The method according to claim 5, wherein the status information of the last data synchronization comprises Anchor information; and
    the detecting by the server that the last data synchronization failed comprises:
        comparing the Anchor from the client with the Anchor which was sent by the client in the last data synchronization and stored in the server database;
        if the Anchor from the client is identical with the Anchor in the server database, determining that the last data synchronization succeeded; otherwise, determining that the last data synchronization failed.

7. The method according to claim 5, wherein the status information of the last data synchronization comprises the data fingerprints generated for the client database through computation based on the predetermined data fingerprint algorithm; and
    the detecting the last data synchronization failed comprises:
        comparing the data fingerprints of the client database from the client with the data fingerprints of the client database which were sent by the client in the last data synchronization and stored in the server database;

if the data fingerprints from the client are identical with the data fingerprints in the server database, determining that the last data synchronization succeeded; otherwise, determining that the last data synchronization failed.

8. The method according to claim 7, wherein the generating data fingerprints for the client database through computation based on the predetermined data fingerprint algorithm comprises one of the following processes:

generating data fingerprints of the client database through the computation based on the predetermined data fingerprint algorithm with the data fingerprints of all directories in the client database or the LUIDs of the data in the directories as inputted elements;

generating data fingerprints of the client database through the computation based on the predetermined data fingerprint algorithm with the data fingerprints of all directories in the client database, or the data fingerprint information of the data in the directory as the inputted elements; and generating data fingerprints of the client database through the computation based on the predetermined data fingerprint algorithm with the data fingerprints or the LUIDs of all data in the client database as inputted elements.

9. The method according to claim 2, wherein if the server modifies a piece of data in the server database, the server inserts an identification bit into the data fingerprints of the data, and stores the data fingerprints, and the determining the data to be synchronized based on a result of the comparing comprises:

determining that the data corresponding to the received data fingerprints need to be synchronized if the server database includes no data fingerprint identical with the received data fingerprints; determining whether the identical data fingerprints in the server database includes an identification bit, if the server database includes data fingerprints identical with the received data fingerprints;

determining that the data corresponding to the received data fingerprints need to be synchronized, if the data fingerprints in the server database include the identification bit, otherwise, determining that the data corresponding to the identical data fingerprints does not need to be synchronized.

10. The method according to claim 2, further comprising:

receiving a data synchronization completing confirmation message from the server, wherein the data synchronization completing confirmation message comprises the data synchronization status information indicating a completion of the data synchronization; and storing the data synchronization status information in the data synchronization completing confirmation message in the server database and returning a response message.

11. The method according to claim 1, further comprising:

obtaining, by the client, one or multiple data fingerprints through a real-time computation based on a predetermined data fingerprint algorithm; or obtaining, by the client, the one or multiple data fingerprints in advance through the computation based on the predetermined data fingerprint algorithm, and storing the one or multiple data fingerprints in the client; and setting, by the server, the data fingerprints for the data in the server database through the computation based on the predetermined data fingerprint algorithm.

12. The method according to claim 1, further comprising:

negotiating, by the client and the server, that a two-party computation smart sync is employed, and the data fingerprints are set through computation based on the predetermined data fingerprint algorithm; and arranging, by the client and the server in advance, an agreement on employing the two-party computation smart sync, wherein the agreement covers all data in the client database and server database, or data of specified types in the client database and server database.

13. The method according to claim 1, wherein the data fingerprint algorithms used in the client and the server are the same data fingerprint algorithm, and the data fingerprint algorithm is determined in advance, or determined after a negotiation between the client and the server.

14. The method according to claim 11, further comprising:

receiving, status information of the last data synchronization and a sync type to be initiated this time, from the server, wherein the sync type is determined according to status of the client database;

determining whether the received sync type is adopted according to the received status information of the last data synchronization, and sending the determined sync type to the client; and receiving the data characteristic verification message carrying one or multiple data fingerprints for data in the client database from the client when the client determines that the received sync type is the two-party computation smart sync.

15. The method according to claim 14, the determining the sync type comprises:

determining to employ the two-party computation smart sync, when the server detects that the last data synchronization failed according to the status information of the last data synchronization, or the mapping table in the server database is lost, or the data fingerprints in the server database are lost.

16. The method according to claim 15, wherein the status information of the last data synchronization, which is sent by the client, comprises Anchor information; and the detecting that the last data synchronization failed comprises:

comparing the Anchor from the client with the Anchor which was sent by the client in the last data synchronization and stored in the server database or generated by the server for the server database, if the Anchor from the client is identical with the Anchor on the server, determining that the last data synchronization succeeded, otherwise, determining that the last data synchronization failed.

17. The method according to claim 15, wherein the status information of the last data synchronization, which is sent by the client, comprises data fingerprints generated for the client database through the computation based on the predetermined data fingerprint algorithm; and the detecting that the last data synchronization failed comprises:

comparing the data fingerprints of the client database from the client with the data fingerprints of the server database; if the data fingerprints of the client database are identical with the data fingerprints of the server database, determining that the last data synchronization succeeded; otherwise, determining that the last data synchronization failed.

18. The method according to claim 17, wherein the generating data fingerprints for the client database through computation based on the predetermined data fingerprint algorithm comprises one of the following processes:

generating data fingerprints of the client database through the computation based on the predetermined data fingerprint algorithm with the data fingerprints of all directories in the client database or the LUIDs of the data in the directories as inputted elements;

generating data fingerprints of the client database through the computation based on the predetermined data fingerprint algorithm with the data fingerprints of all directories in the client database, or the data fingerprint information of the data in the directory as the inputted elements; and generating data fingerprints of the client database through the computation based on the predetermined data fingerprint algorithm with the data fingerprints or the LUIDs of all data in the client database as inputted elements.

19. The method according to claim 1, wherein the information indicating the determined data to be synchronized comprises:

LUIDs of the data to be synchronized, or the data fingerprints of the data to be synchronized in the client database, or status codes corresponding to the data fingerprints of the data to be synchronized in the client database.

20. The method according to claim 1, wherein the data includes directories, files or data items.

21. The method according to claim 20, wherein when the data includes the directory, the data fingerprints of the directory are set through computation based on the predetermined data fingerprint algorithm with the data fingerprints of the data in the directory or the LUIDs of the data under the directory as inputted elements;

when the data includes the file or the data item, the data fingerprints of the file or data item are set through computation based on the predetermined data fingerprint algorithm with contents of the file or the data item as inputted elements.

22. The method according to claim 1, wherein the data fingerprint is obtained by computing the data based on a preset data fingerprint algorithm or a data fingerprint algorithm negotiated by the client and the server, and when the data is modified a new data fingerprint is generated and the data fingerprint is updated by using the new data fingerprint.

23. The method according to any one of claim 2, wherein the predetermined data fingerprint algorithm includes one of the following algorithm: a digest algorithm, a cyclic redundancy check algorithm, a normal hash algorithm, and a timestamp algorithm.

24. A computer program product for use in a server used to synchronize a client database, wherein the computer program product comprising one or more computer executable instructions stored on a non-transitory computer readable medium such that when executed by a processor cause the server to perform the following:

receiving, from a client, a data characteristic verification message that includes a plurality of Local Unique Identifiers (LUIDs) with corresponding data fingerprints that each represent portions of data in the client database for synchronization with a server database, wherein each of the corresponding data fingerprints uniquely identify contents of the portions of data in that different data has different data fingerprints and identical data has identical data fingerprints;

based on the plurality of LUIDs, comparing one or more of the corresponding data fingerprints included within the data characteristic verification message with one or more data fingerprints stored on the server database;

based on the comparison, determining at least one of the portions of data on the client database that needs to be synchronized with the server database; and based on the determination, sending the client a data characteristic verification response that includes at least one of the plurality of LUIDs corresponding to the at least one of the portions of data on the client database that needs to be synchronized, which indicates to the client what data to synchronize with the server database.

* * * * *